US012387256B2

(12) United States Patent
Crossley et al.

(10) Patent No.: US 12,387,256 B2
(45) Date of Patent: Aug. 12, 2025

(54) MACHINE-BASED OBJECT RECOGNITION OF VIDEO CONTENT

(71) Applicant: Painted Dog, Inc., New York, NY (US)

(72) Inventors: Vincent Alexander Crossley, New York, NY (US); Jared Max Browarnik, Brooklyn, NY (US); Tyler Harrison Cooper, Brooklyn, NY (US); Carl Ducey Jamilkowski, New York, NY (US)

(73) Assignee: Painted Dog, Inc., New York, NY (US)

( * ) Notice: Subject to any disclaimer, the term of this patent is extended or adjusted under 35 U.S.C. 154(b) by 0 days.

(21) Appl. No.: 18/633,140

(22) Filed: Apr. 11, 2024

(65) Prior Publication Data

US 2024/0403946 A1 Dec. 5, 2024

Related U.S. Application Data

(60) Division of application No. 17/702,139, filed on Mar. 23, 2022, now Pat. No. 11,966,967, which is a
(Continued)

(51) Int. Cl.
*G06Q 30/0601* (2023.01)
*G06F 16/955* (2019.01)
(Continued)

(52) U.S. Cl.
CPC ..... *G06Q 30/0643* (2013.01); *G06F 16/9558* (2019.01); *G06V 20/20* (2022.01);
(Continued)

(58) Field of Classification Search
CPC ............. G06Q 30/0643; G06F 16/9558; G06V 20/20; G06V 20/46; G06V 2201/10;
(Continued)

(56) References Cited

U.S. PATENT DOCUMENTS 7,840,415 B2    11/2010   Schifone
7,987,098 B2     7/2011   Schifone
(Continued)

FOREIGN PATENT DOCUMENTS

WO    2015048377 A1    4/2015
WO    2015054644 A1    4/2015
(Continued)

OTHER PUBLICATIONS

Office Action (Summons for hearing) in European Patent Application No. 17872039.7 dated Nov. 8, 2023, 11 pages.
(Continued)

*Primary Examiner* — Casey L Kretzer
(74) *Attorney, Agent, or Firm* — Smith Baluch LLP

(57) ABSTRACT

Current interfaces for displaying information about items appearing in videos are obtrusive and counterintuitive. They also rely on annotations, or metadata tags, added by hand to the frames in the video, limiting their ability to display information about items in the videos. In contrast, examples of the systems disclosed here use neural networks to identify items appearing on- and off-screen in response to intuitive user voice queries, touchscreen taps, and/or cursor movements. These systems display information about the on- and off-screen items dynamically and unobtrusively to avoid disrupting the viewing experience.

16 Claims, 34 Drawing Sheets

Related U.S. Application Data division of application No. 16/409,144, filed on May 10, 2019, now Pat. No. 11,317,159, which is a continuation-in-part of application No. PCT/US2017/062284, filed on Nov. 17, 2017.

(60) Provisional application No. 62/423,495, filed on Nov. 17, 2016.

(51) Int. Cl.
| | | |
|---|---|---|
| *G06V 20/20* | (2022.01) | |
| *G06V 20/40* | (2022.01) | |
| *H04N 21/237* | (2011.01) | |
| *H04N 21/431* | (2011.01) | |
| *H04N 21/4725* | (2011.01) | |
| *H04N 21/478* | (2011.01) | |
| *H04N 21/858* | (2011.01) | |

(52) U.S. Cl.
CPC .......... *G06V 20/46* (2022.01); *H04N 21/237* (2013.01); *H04N 21/4316* (2013.01); *H04N 21/4725* (2013.01); *H04N 21/47815* (2013.01); *H04N 21/858* (2013.01); *G06V 2201/10* (2022.01)

(58) Field of Classification Search
CPC ............. H04N 21/237; H04N 21/4316; H04N 21/4725; H04N 21/47815; H04N 21/858
See application file for complete search history.

(56) References Cited

U.S. PATENT DOCUMENTS

| | | | |
|---|---|---|---|
| 8,312,486 | B1 | 11/2012 | Briggs et al. |
| 8,458,053 | B1 | 6/2013 | Buron et al. |
| 8,533,753 | B2 | 9/2013 | Briggs et al. |
| 8,549,555 | B2 | 10/2013 | Briggs et al. |
| 8,682,739 | B1 | 3/2014 | Feinstein |
| 8,769,053 | B2 | 7/2014 | Spitz et al. |
| 8,782,690 | B2 | 7/2014 | Briggs et al. |
| 8,813,132 | B2 | 8/2014 | Andrews et al. |
| 9,338,500 | B2 | 5/2016 | Briggs et al. |
| 9,344,754 | B2 | 5/2016 | Briggs et al. |
| 9,351,032 | B2 | 5/2016 | Briggs et al. |
| 9,451,010 | B2 | 9/2016 | Spitz et al. |
| 9,607,330 | B2 | 3/2017 | Spitz et al. |
| 9,674,584 | B2 | 6/2017 | Briggs et al. |
| 9,697,504 | B2 | 7/2017 | Spitz et al. |
| 9,813,770 | B2 | 11/2017 | Andrews et al. |
| 9,875,489 | B2 | 1/2018 | Spitz et al. |
| 9,953,347 | B2 | 4/2018 | Spitz et al. |
| RE46,865 | E | 5/2018 | Schifone |
| 9,986,305 | B2 | 5/2018 | Briggs et al. |
| 10,055,768 | B2 | 8/2018 | Briggs et al. |
| 10,171,555 | B2 | 1/2019 | Spitz et al. |
| 10,225,614 | B2 | 3/2019 | Andrews et al. |
| 11,317,159 | B2 | 4/2022 | Crossley et al. |
| 2006/0117352 | A1 | 6/2006 | Yamagata et al. |
| 2006/0251292 | A1 | 11/2006 | Gokturk et al. |
| 2008/0168055 | A1 | 7/2008 | Rinearson et al. |
| 2008/0295129 | A1* | 11/2008 | Laut ..................... H04N 21/812 725/34 |
| 2009/0327894 | A1* | 12/2009 | Rakib ............ H04N 21/234318 709/219 |
| 2010/0082653 | A1 | 4/2010 | Nair |
| 2010/0145820 | A1* | 6/2010 | Johnson ............. G06Q 30/0261 705/26.1 |
| 2010/0153831 | A1 | 6/2010 | Beaton |
| 2010/0281373 | A1 | 11/2010 | Pueyo et al. |
| 2011/0016487 | A1 | 1/2011 | Chalozin et al. |
| 2011/0137753 | A1 | 6/2011 | Moehrle |
| 2011/0247042 | A1 | 10/2011 | Mallinson |
| 2012/0167145 | A1 | 6/2012 | Incorvia |
| 2012/0185886 | A1 | 7/2012 | Charania et al. |
| 2013/0014155 | A1* | 1/2013 | Clarke ................. G11B 27/105 725/32 |
| 2013/0019268 | A1 | 1/2013 | Fitzsimmons et al. |
| 2013/0039547 | A1 | 2/2013 | Liu et al. |
| 2014/0282638 | A1 | 9/2014 | Pequignot |
| 2015/0245103 | A1 | 8/2015 | Conte |
| 2016/0042251 | A1 | 4/2016 | Cordova-Diba et al. |
| 2016/0182969 | A1 | 6/2016 | Berry et al. |
| 2016/0191981 | A1 | 6/2016 | Briggs et al. |
| 2016/0191982 | A1 | 6/2016 | Briggs et al. |
| 2016/0191983 | A1 | 6/2016 | Briggs et al. |
| 2016/0191984 | A1 | 6/2016 | Briggs et al. |
| 2016/0192015 | A1 | 6/2016 | Briggs et al. |
| 2016/0192031 | A1 | 6/2016 | Briggs et al. |
| 2016/0196264 | A1 | 7/2016 | Bostick et al. |
| 2016/0203525 | A1 | 7/2016 | Hara et al. |
| 2016/0225053 | A1 | 8/2016 | Romley et al. |
| 2016/0371546 | A1 | 12/2016 | Yadav et al. |
| 2017/0134779 | A9 | 5/2017 | Briggs et al. |
| 2017/0195400 | A1 | 7/2017 | Spitz et al. |
| 2017/0301003 | A1 | 10/2017 | Spitz et al. |
| 2018/0018724 | A1 | 1/2018 | Spitz et al. |
| 2018/0077466 | A1 | 3/2018 | Briggs et al. |
| 2018/0107993 | A1 | 4/2018 | Spitz et al. |
| 2018/0240159 | A9 | 8/2018 | Briggs et al. |
| 2018/0249217 | A1 | 8/2018 | Andrews et al. |
| 2018/0255363 | A1* | 9/2018 | Zhao ................. G06Q 30/0235 |
| 2018/0308131 | A1 | 10/2018 | Spitz et al. |
| 2018/0338188 | A1 | 11/2018 | Briggs et al. |
| 2019/0095955 | A1 | 3/2019 | Spitz et al. |
| 2019/0147502 | A1 | 5/2019 | Briggs et al. |

FOREIGN PATENT DOCUMENTS

| | | |
|---|---|---|
| WO | 2015138612 A1 | 9/2015 |
| WO | 2016109810 A1 | 7/2016 |

OTHER PUBLICATIONS

Office Action in European Patent Application No. 17872039.7 dated Mar. 21, 2022, 10 pages.

Reply to Office Action in European App. No. 17872039.7 dated Sep. 20, 2022, 8 pages.

Extended European Search Report in European Patent Application No. 17872039.7 dated May 29, 2020, 11 pages.

International Search Report and Written Opinion in International Patent Application No. PCT/US2017/062284 mailed Jan. 30, 2018, 13 pages.

Unpublished U.S. Appl. No. 14/527,854, filed Oct. 30, 2014.

* cited by examiner

MACHINE-BASED OBJECT RECOGNITION OF VIDEO CONTENT

CROSS-REFERENCE TO RELATED APPLICATIONS

The present application is a divisional of U.S. application Ser. No. 17/702,139, filed Mar. 23, 2022, which is a divisional of U.S. application Ser. No. 16/409,144, filed May 10, 2019, which in turn claims the benefit, under 35 U.S.C. § 120, as a continuation-in-part (CIP) of PCT Application No. PCT/US2017/062284, filed Nov. 17, 2017, entitled "Machine-Based Object Recognition of Video Content."

PCT/US2017/062284 claims priority, under 35 U.S.C. § 119, to U.S. Application No. 62/423,495, entitled "Methods and Apparatus for Displaying Products Related to Video Content" and filed on Nov. 17, 2016.

Each of the above-mentioned applications is incorporated herein by reference in its entirety.

BACKGROUND

The state of video has remained largely unchanged for decades. While some attempts have been made to modernize video through the addition of interactivity, these attempts have fallen short for various reasons. For one, the information provided through previous attempts at interactivity has generally been extremely limited. This is largely because the manpower required for manually annotating a video including hundreds of thousands of frames is prohibitively expensive. In addition, previous interactive video interfaces have been unintuitive and very disruptive to the viewing experience.

SUMMARY

Embodiments of the present technology address problems with annotating videos and displaying interactive video interfaces. First, a machine learning engine that can automatically generate metadata for media content reduces the manpower required for thorough annotation of content. Second, new interactive interfaces seamlessly relay this metadata to users without interrupting the users' goal of viewing content. These two elements combined allow for the broad distribution and adoption of detailed interactive video.

The present technology includes a method for identification of objects featured in video content and displaying user interfaces that enables users to retrieve more information about the identified objects. Examples of user interfaces that can be used individually or together with a real-time image recognition engine are discussed with reference to an Overlaid Video Player user interface and an Adjacent Layout user interface. Together, the Overlaid Video Player user interface and the Adjacent Layout user interface address a variety of technical problems associated with current technology for real-time image recognition, real-time retrieval of information of recognized objects and other suitable user-initiated processes related to objects recognized in video content. Although the examples of the subject technology are discussed in the context of user interactions related to browsing and buying items featured in video content, the subject technology could be employed in contexts such as surveillance, evidence gathering, and other suitable contexts.

For instance, current solutions for purchasing products related to video content are difficult to use and have a low purchase rate. To increase engagement and purchase click through rate, the Overlaid Video Player makes purchasing products through video content more intuitive for users via an interface that displays product images in real-time alongside the video. It presents the products on top of the video in a non-intrusive way that allows users to easily click to purchase in a minimal number of steps. The Adjacent Layout can also bring more visibility to the products in video content and are another opportunity for users to make product purchases.

Other technical problems include updating the Overlaid Video Player's interface often enough to provide a seamless display. In order to maintain context with the video, the Overlaid Video Player interface should be updated frequently (e.g., at a frequency of about 1-4 times per second). This rate is too rapid to execute a network request for each interval.

To address this problem, the Overlaid Video Player downloads key data for each video segment (e.g., 0-15 minutes of video content) at the beginning of the segment in a compressed format and caches the key data on the user's device. This allows the interface to be updated frequently by using the cached data on the device, which is much faster than performing an external network request to fetch the data.

Compatibility is another technical consideration for the Overlaid Video Player user interface. The Overlaid Video Player user interface should interface with many different underlying video player technologies (e.g., HTML5, Flash, etc.) in order to be distributed broadly. This includes being able to play/pause/seek the video, and being informed about the state of the video (e.g., current time, playing/paused, whether an ad is playing, etc.). To address this problem, the Overlaid Video Player interface may be coupled to a generic relay (FIG. 1B—Metadata Controller) that cases communication between the Overlaid Video Player interface and the underlying video player. This generic relay makes it easy to plug the interface into new video players.

Embodiments of the present technology include various methods and systems. Some of these methods include receiving, by an electronic device, a request from a user for video content; requesting, by the electronic device, the video content from a video server; and requesting, by the electronic device, metadata about an object associated with a person appearing in the video content from a metadata server. Respective pieces of the metadata are aligned with respective frames of the video content. The electronic device shows, on its display, a first frame of the video content to the user. This first frame includes an image of the person and may or may not show the object associated with the person. In response, the electronic device receives a request from the user for the metadata about the object associated with the person. And in response to the request from the user, the electronic device displays a first piece of metadata about the object with the video content. This first piece of metadata may be aligned with the first frame.

In some examples of these methods, receiving the metadata includes receiving product identification information for objects worn by every person appearing in the video content. This metadata may include links for obtaining the objects worn by every person appearing in the video content. The electronic device may display a corresponding link for obtaining the object, and the corresponding link may dynamically redirect the user to a website for obtaining the object. In some cases, the metadata includes a link for obtaining an object similar to the object worn by the person appearing in the video content. The electronic device may display this type of link as well.

The electronic device may receive the user's request in any of a variety of formats. For instance, a microphone of the electronic device may receive the user's request as a voice command or voice query. Or the electronic device may receive the user's request by detecting, proximate to a play bar area of the display of the electronic device, a cursor movement or touch on a touchscreen.

In some examples of these methods, the electronic device stores the metadata about the object in a memory of the electronic device before displaying the frame of the video content to the user. The electronic device may also request metadata about another object associated with another person appearing in a second frame of the video content while displaying the video content to the user. And the electronic device may pause playback of the video content in response to the request from the user.

Other embodiment methods include receiving, at a server, a first request from a user for metadata about an object appearing in a video on a user device and determining, by the server, that a metadata database does not have the metadata about the object. In response to determining that the metadata database does not have the metadata about the object, the server sends a query for an identity of the object appearing in the video to an object recognition server. The server receives the identity of the object appearing in the video from the objection recognition server and obtains the metadata about the object based on the identity of the object. The server then provides the metadata for display to the user, and the user device displays at least a portion of the metadata with the video. If desired, this metadata is stored in the metadata database and retrieved in response to subsequent requests for the metadata.

In some case, the objection recognition server implements at least one neural network that recognizes the object appearing in the video. The neural network may do this by generating an embedding representing the object appearing in the video and performing a comparison of this embedding to a plurality of embeddings stored in an object database. Respective embeddings of the plurality of embeddings represent respective objects of a plurality of objects. The neural network may determine the identity of the object based on the comparison, e.g., by identifying a closest match from among the plurality of objects as the object. If desired, the neural network may identify, based on the comparison, another object similar to the original object from among the plurality of objects. In these cases, the server may provide metadata associated with this other object to the user. And the user device may display at least a portion of the metadata associated with the other object to the user.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 6A-6F illustrate an Overlaid Video Player interface provided by the system of FIG. 1A, according to an embodiment.

FIGS. 7A-7G illustrate using an Adjacent Layout interface on a computer desktop, according to an embodiment.

FIGS. 9A and 9B show different views of an Adjacent Layout interface integrated with an Overlaid Video Player, according to an embodiment.

DETAILED DESCRIPTION

Figure 1A:
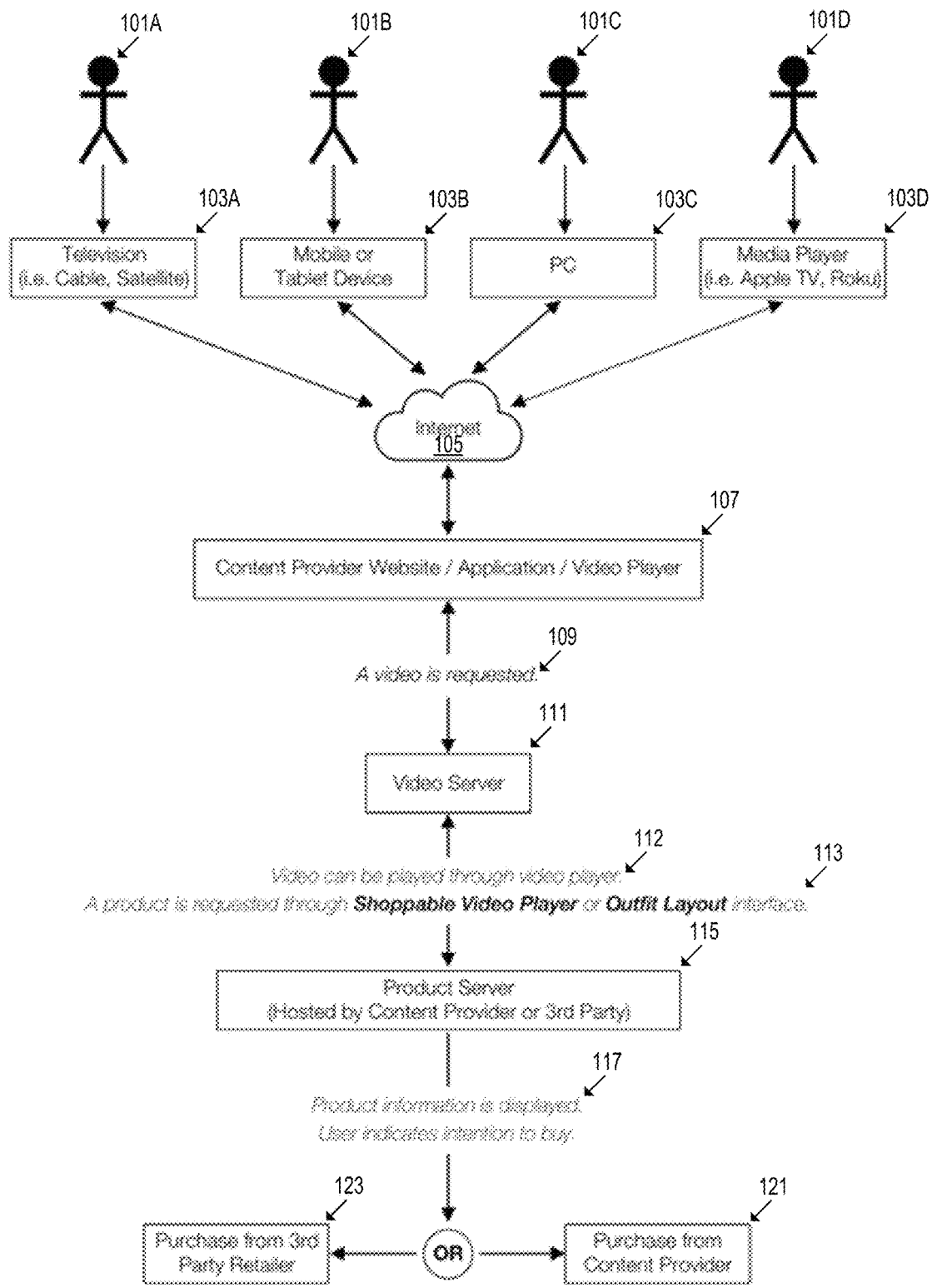
FIG. 1A is a diagram of system used to provide video content via a television, computer, mobile device, or other media player, according to an embodiment.

An overall view of the system can be seen in FIG. 1A. A user (e.g., any of users 101A-101D) begins with a device that can play video content. Some example devices enabled to play video content include a television 103A, a mobile/tablet device 103B, a personal computer (PC) 103C, and a streaming media player 103D (e.g., an Apple TV or Roku device). Via, for example, the Internet 105, the user's device accesses video content provided by a Content Provider 107. Each of the computer devices 103A-103D has a "video player platform" that the user interacts with to play the videos. For example, on a mobile/tablet device 103B or PC 103C, the video player platform is typically a web browser or a software application. With media players 103D (e.g., Apple TV, Roku, Google Chromecast, etc.), the video player platform is typically a native application. And on television 103A (e.g., cable, satellite, or smart TV), the video player platform is typically a proprietary system developed specifically for that technology. The system shown in FIG. 1A can be integrated into or used with whatever device is used to play the video.

On the device and video player platform (in this example, a PC with a web browser), the user navigates to a page where a video can be played. The website requests the video at 109 from the Video Server 111, and the Video Server responds to the request by transmitting video data (not shown in FIG. 1) to the user's video player platform (in this example, the web browser). The user's video player platform then plays the video (as indicated at 112) on the device's screen (e.g., a liquid crystal display coupled to PC 103C). One or both of the "interactive components" (the Overlaid Video Player and the Adjacent Layout) can be integrated on the page presented on the screen.

The code to integrate the interactive components on the video player platform can be added to the Content Provider's code that displays the video or the page that the video appears on. Alternatively, the code can be developed and served to the video player platform by a Third Party Metadata Service which provides the code (or an application programming interface (API)) for the Content Provider to integrate on the video player platform. Another alternative is for the Content Provider or a third party to place the code in a plug-in or extension (e.g., a web browser extension or a streaming media player plugin) that can detect content and inject the interactive component code onto the page (even if the content or page is not owned by the Content Provider or third party that is injecting the code). In all cases, when the interactive components are integrated, the code retrieves the appropriate product images and information at 113 from the metadata server 115 (hosted by the Metadata Provider) and displays (e.g., at 117) them on screen for the user to see.

The interactive components (and metadata server) are not restricted to displaying products related to the video. They can be used to display information about anything related to the video, such as services, physical locations or general information about the video. For example, they can be used to display details about a restaurant that appears in the video and allow users to book a reservation to dine there. Or they can be used to display trivia or facts about the characters or how the video was made. The interactive components are typically associated to a range of frames and a point in time during the video, but can also be general and associated with the video as a whole. When referring to a "product" in this document, keep in mind that this also includes services, physical locations, or any information related to people or objects appearing in the video.

A user interacting with the interactive components may have the ability to see additional information about a product or purchase a product. In some cases, the product can be purchased directly from the Content Provider as shown at 121. For example, if the Content Provider is a product retailer, they may want to display a video that features their products. The user can then add the products to a shopping cart and purchase directly from the Content Provider/Retailer website where the video appears.

In another case, the Content Provider is not a retailer and does not sell their own products. An example of this would be a television studio's website, where they allow users to view (and shop) clips and full episodes of their shows. In this case, the Content Provider may choose to send users to one or more third party retailer websites to complete their purchase as shown at 123. Another option for this case is to use a universal shopping cart solution or a retailer's API that, when integrated, allows the user to make a purchase (or add to a retailer website's shopping cart) without leaving the Content Provider's website.

On televisions, media streamers or other devices and video platforms that do not allow for easy user input of payment (e.g., credit card) information, another integration option is possible. When the user indicates they want to purchase an item, the Content Provider's (or the Third Party Video Service's) code can display on the page a short URL and/or offer the option to receive an SMS message (with an URL) on their mobile device, where they can complete the purchase.

Figure 1B:
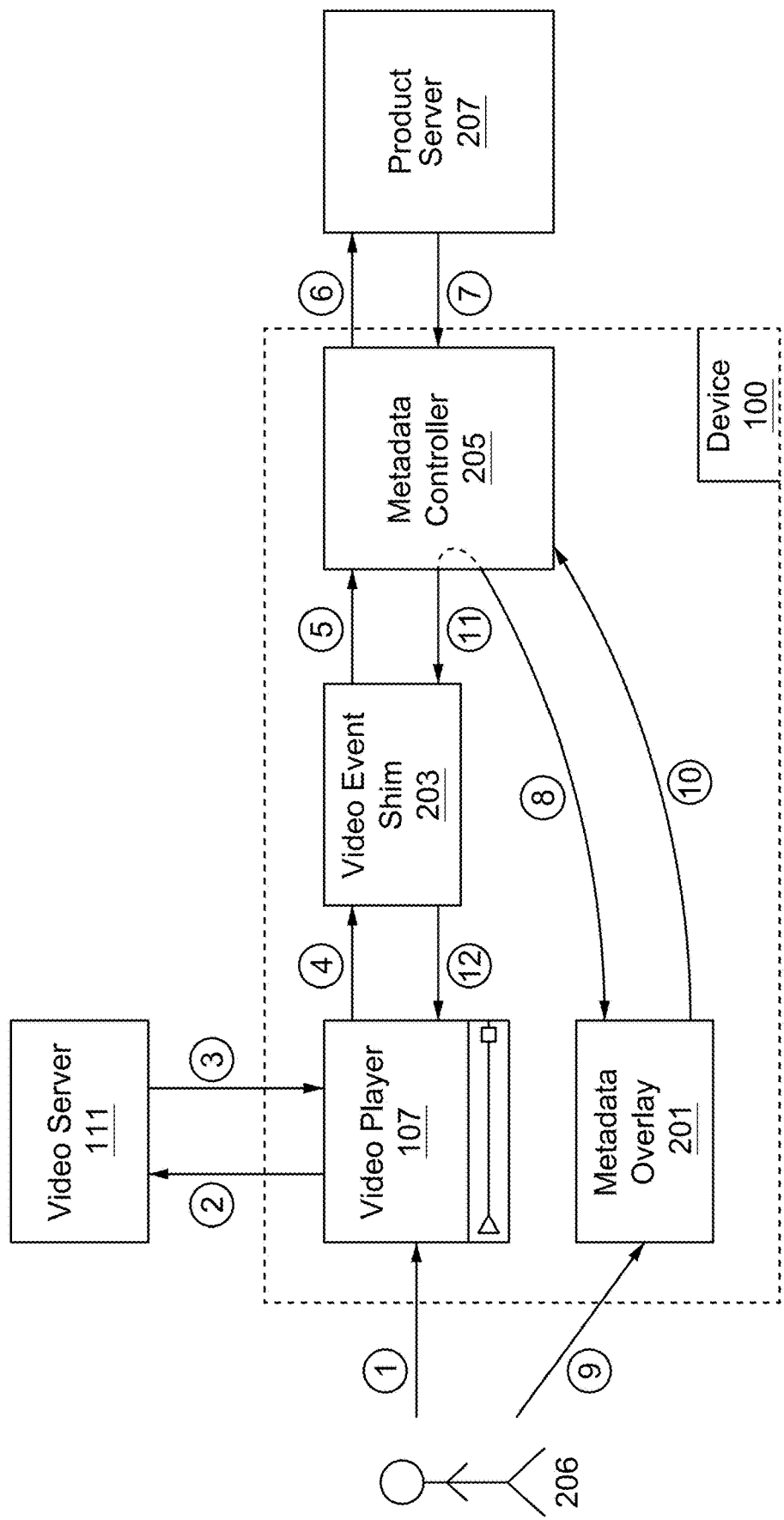
FIG. 1B is a block diagram illustrating the operation of the system shown in FIG. 1A, according to an embodiment.

FIG. 1B is a flowchart that illustrates how the system shown in FIG. 1A operates. The user 206 sends a request to play a video on the compute device 100 (step 1). The compute device 100, which may be a smart television, smart phone, computer, or tablet, includes a processor, memory, display, and network interface (e.g., an antenna, Ethernet port, or coaxial cable connection) that together implement the video player 107, video event shim 203, and metadata controller 205 shown in FIG. 1B.

In response to receiving the user's request, the video player 107 requests a video from the video server 111 (step 2). The video server 111 delivers the video to the video player 107 (step 3). Once the video starts playing at the video player 107, a video event shim 203 receives an event message (video frame time stamp) from the video player 107 indicating that playback has started (step 4). In addition, the video event shim 203 sends a notification message to a metadata controller 205 indicating that the playback of the requested video has started (step 5). The metadata controller 205 requests metadata associated with the corresponding event (video frame time stamp) from product server 207 (step 6), possibly in response to a user request via the interfaces described below, and the product server 207 locates, retrieves, and sends the requested metadata to the metadata controller 205 (step 7). Likewise, the metadata controller 205 sends the requested metadata to a metadata overlay 201 (step 8) for display by the video player 107.

If the user 203 selects on a product displayed by the metadata overlay 201 (step 9), the metadata overlay 201 sends a notification message to the metadata controller 205 (step 10). In response, the metadata controller 205 sends a command to the video event shim 203 to pause the video at the video player 107 (step 11) and the video event shim sends a pause message to the video player 107 (step 12). The metadata controller 205 may also update the video overlay or adjacent layout to show detailed information for the product or takes an action such as opening a new browser tab with the retail page for the product.

The interactions illustrated in FIG. 1B can be implemented in a variety of different orders. For instance, the metadata controller 205 may request, receive, and cache (store in local memory) the metadata for the entire video before the video player 107 begins playing the video. This reduces network traffic during playback and reduces or eliminates the likelihood that an interruption in network connectivity disrupts retrieval and display of the metadata in response to user requests. Alternatively, the metadata controller 205 may request, receive, and cache (store in local memory) metadata at intervals, e.g., periodic intervals, intervals between commercials, or intervals associated with particular scenes. Again, this reduces disruptions caused by breaks in network connectivity. The metadata controller 205 can also query the metadata server in real-time, e.g., in response to user requests and/or based on the state of the video playback.

The metadata is time-aligned to the video frames using the video frame time stamps. This enables the metadata controller 205 to request and queue metadata based on the state of the video playback, e.g., for real-time metadata requests or requests for metadata at intervals. For example, the video frames may be tagged with metadata at a rate of 1 to 4 frames per second (fps). For playback speeds of 24 fps, this works out to one to four frames tagged with metadata being displayed every second; for faster playback speeds (e.g., the 60 fps used in high-definition video), the tagged frame rate may remain at 1-4 fps, with a lower percentage of tagged frames.

The metadata for each tagged video frame may include object or product identification information (e.g., product IDs) for all objects and products associated with the people appearing in the video frame, regardless of whether the objects and products appear in the frame. In other words, the metadata may include object or product IDs for objects or products that don't appear in the frame. For instance, even if a person's feet or lower body don't appear in the video frame, the metadata may include information about the shoes and pants worn by the person. This enables the system to respond to user queries like "What is he wearing?" by displaying information about every item worn by the person instead of just the items appearing on screen.

In some cases, the metadata controller 205 may temporarily store or query information about recent frames, e.g., frames displayed over the past few seconds or minutes. Again, this enables the system to respond to user queries like "What is he wearing?" or "What car was she driving?" by retrieving and displaying information about items that don't appear on screen when the user makes his or her query.

If desired, the metadata may include information about items related to the items associated with the person or people appearing in the video. For instance, if one item is a particular leather jacket, the metadata may include information about similar leather jackets or about accessories that pair well with the leather jacket (e.g., boots or bags). Similar items may be linked by their product IDs to reduce the amount of data transferred among servers and controllers during the query process. The similar items may be identified before or during playback. If they are identified during playback, they can be identified according to predetermined relationships stored in a database or dynamically using one or more neural networks implemented using an object recognition server as described below.

Item metadata may also include links (e.g., uniform resource locators (URLs)) to websites that offer the items for sale. These links may be static and can be assigned ahead of time or as the metadata is requested, e.g., in response to a real-time internet auction like those conducted for placing internet advertisements. The links may point to a redirect page that redirects the user to a third-party website based on item availability, price, relationship, or the result of a real-time internet auction.

Real-Time Object Recognition

Figure 2:
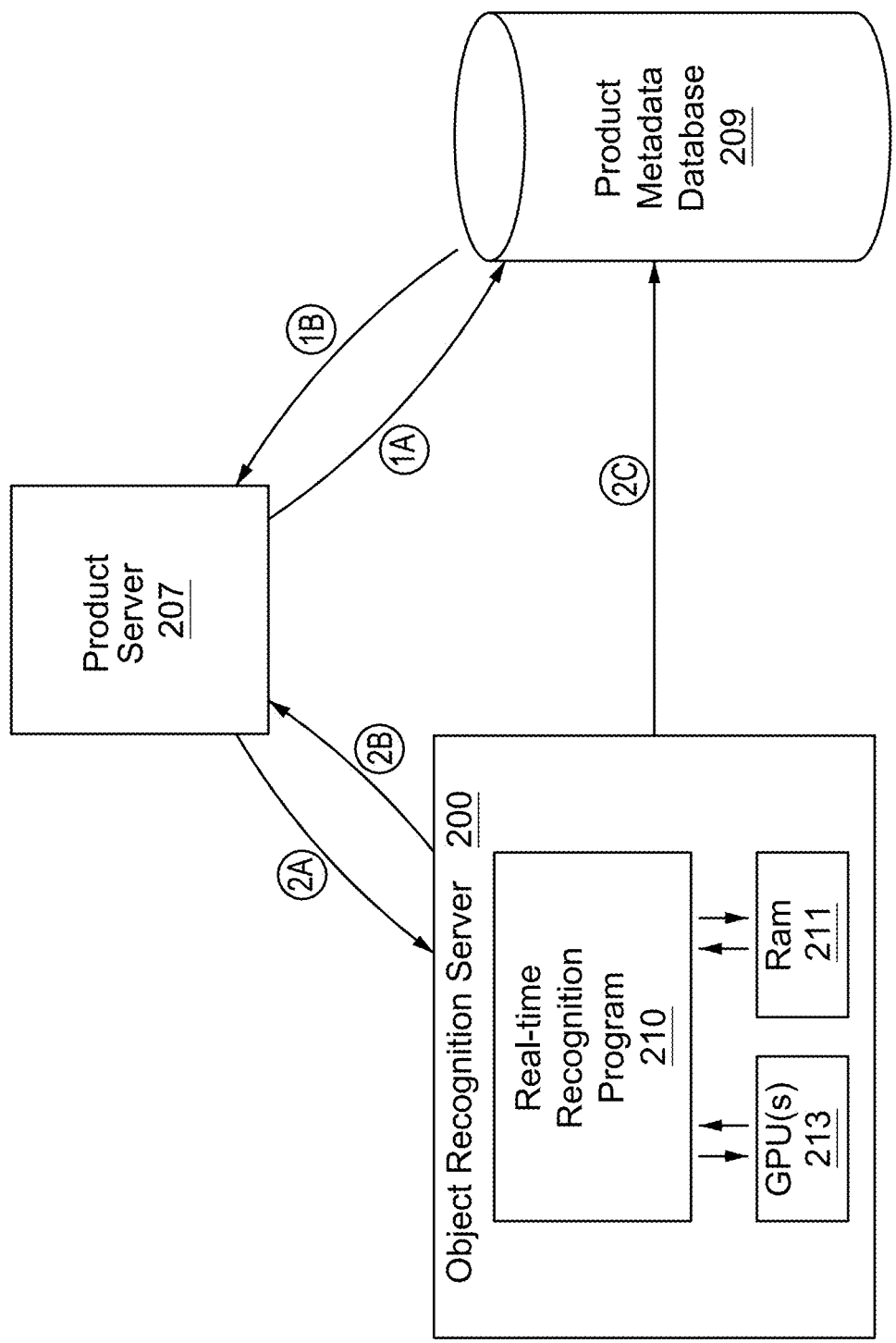
FIG. 2 is a block diagram of a system for real-time, machine-based object recognition, according to an embodiment.

FIG. 2 is a diagram illustrating a system for real-time, machine-based object recognition, according to an embodiment. The system includes a product server 207 coupled to a product metadata database 209 and an object recognition server 200. The product metadata database 209 contains previously indexed metadata associated with videos.

The object recognition server 200 can include one or more graphical processing units (GPUs) 213, random access memory (RAM) 211, a network interface (not shown in FIG. 2), and other suitable hardware. The object recognition server 200 includes processor executable instructions to implement a real-time recognition application 210. One or more GPUs 213 included in the object recognition server 200 execute these memory instructions.

Images in a user-requested video can be recognized for a first time using the real-time recognition application 210 while a user watches a video. Concurrently the real-time recognition application 210 can store metadata of the recognized objects, including a reference timestamp corresponding to a time within the video duration, and other suitable information associated with the objects included in the video frames of a video. Accordingly if a second user requests to watch the same video, the real-time recognition application 210 does not have to analyze the video again. Thus, the product server 207 can retrieve the data from the product metadata database 209.

In operation, the product server 207 can obtain metadata in real-time using the object recognition server 200 and fetch previously indexed metadata from the product metadata database 209. To access real-time or previously indexed metadata, the product server 207 can send metadata requests to product metadata database 209 to retrieve metadata for the display of product information on, for example, metadata overlay 201 discussed with reference to FIG. 1B (step 1A). In step 1B, the product metadata database 209 responds to product server 207 with the requested metadata when the metadata is available; in other instances, when the requested metadata is not available at the product metadata database 209, the product metadata database 209 sends a message to product server 207 indicating that the requested metadata was not found.

When operating in real-time recognition mode, the product server 207 sends a request to the object recognition server 200 when the product server 207 receives a message indicating that the requested metadata was not found at the product metadata database 209 (step 2A). The real time recognition application 210 responds to metadata requests received from product server 207 by generating the requested metadata, including metadata describing and/or identifying, for example, products, characters, or other suitable entities shown at a video frame displayed at the video player 107 (shown in FIG. 1A and FIG. 1B; step 2B). The object recognition server 200 sends this metadata to the product server 207 for display on the metadata overlay 201 (shown in FIG. 1B). The object recognition server 200 can also send this metadata to the product metadata database 209 (step 2C). Thus, the product server 207 can retrieve such metadata directly from product metadata database 209 in the future, reducing computational costs (e.g., processing time, and GPU workload) incurred by execution of the real-time recognition program 210.

Neural Networks for an Object Recognition Server

A neural network or a mapping function may be configured to extract features from images (e.g., visual features) or any of the aforementioned inputs. In some implementations, the neural network may be configured to use convolutional layers. Each convolutional layer's parameters comprise a set of learnable filters (or kernels), which have a small receptive field. During computation of the model, each filter is convolved across the input, producing an activation map of that filter. As a result, the network learns filters that activate when it detects some specific type of feature at some spatial position in the input. Convolutional layers are particularly useful for learning translation invariance of features found in images. With properly tuned convolutional layers, a feature is equally recognized in one region of the image as in another.

The neural network may be a deep neural network (i.e., a neural network with more than one hidden layer). Deep neural networks utilize more parameters than simple neural networks and are therefore more capable of learning complex features.

The neural network may use a regularization method like batch normalization to improve training speed and reduce overfitting of the model.

The neural network may use a rectified linear unit activation to compute each individual neuron's activation. Other possible activation functions that may be used include the log-sigmoid and tan-sigmoid.

The neural network may be configured to use pooling layers. It may also be configured to use fully connected layers. Fully connected layers are layers which have neurons that are fully connected to the previous layer's neurons. For 'n' neurons in the current fully connected layer and 'm' neurons in the previous layer, there are 'n×m' connections and parameter weights between the two layers.

Figure 3:
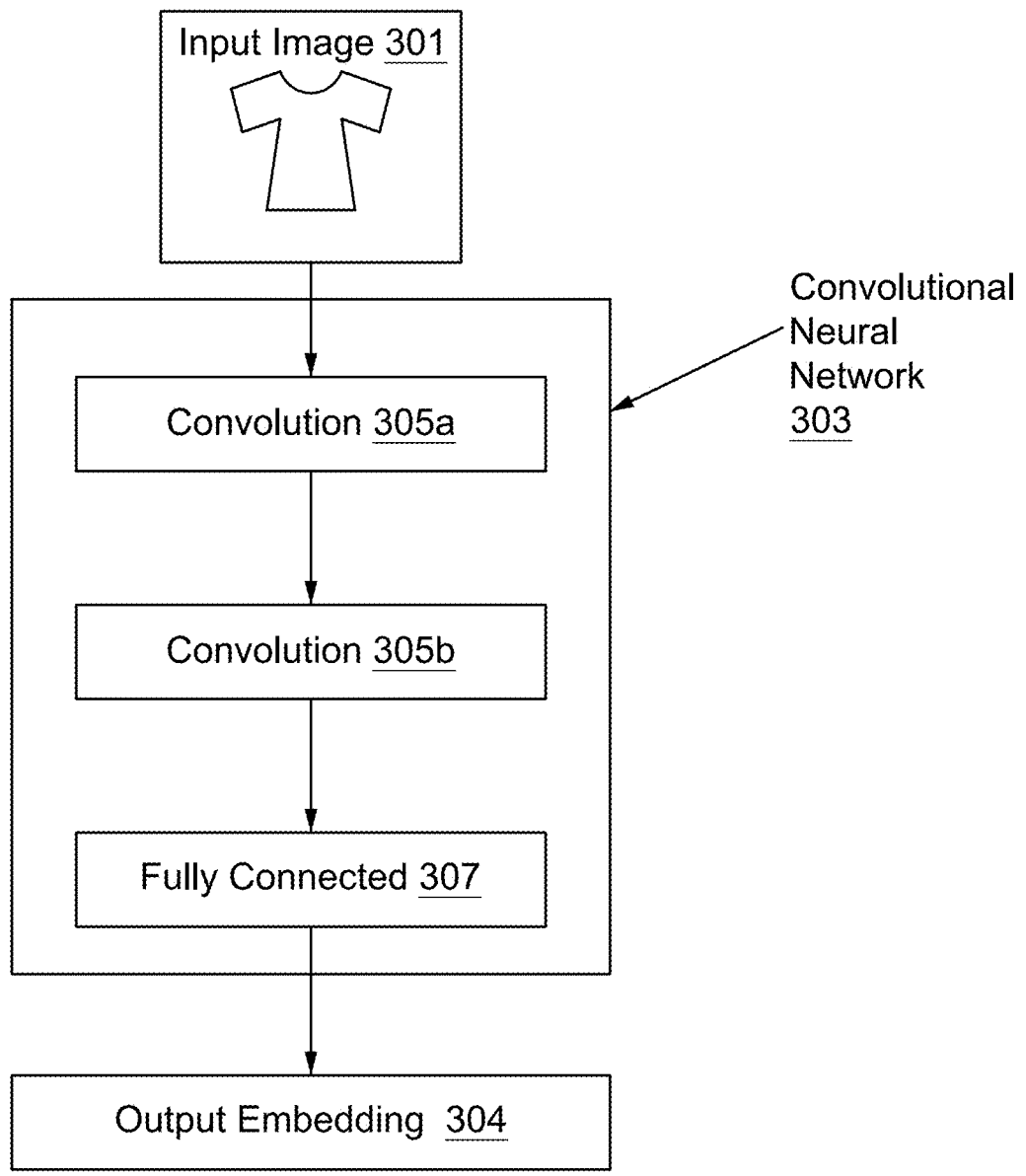
FIG. 3 is an example of an architecture of a machine learning model for real-time image recognition, according to an embodiment.

FIG. 3 is an example of an architecture of a machine learning model used by the object recognition server for real-time image recognition, according to an embodiment. This example is a convolutional neural network 303 that operates on an input image 301. The convolutional neural network 303 includes several convolutional layers, shown in FIG. 3 as convolutional layers 305A and 305B (collectively, convolutional layers 305). As readily understood by those of skill in the art, the convolutional layers 305 emulate the response of neurons to a visual stimulus—here, the input image 301. A fully connected layer 307 connects neurons in the convolutional layers 305 to each other. Together, the convolutional layers 305 and fully connected layer 307 operate on the input image 301 to produce output embeddings 309 representing the convolutional neural network's response to the input image 301. For instance, the output embeddings 309 may indicate the likelihood that a particular object (e.g., an article of clothing) appears in the input image 301.

In operation, the neural network 303 shown in FIG. 3 can recognize objects in real-time as follows. When the object recognition server receives a video frame, it passes the image to a first implementation of the neural network. This first implementation identifies and draws bounding boxes around objects appearing in the video frame. A second implementation of the neural network computes embeddings for the objects in the bounding boxes. (Alternatively, a single implementation of the neural network may determine the bounding boxes and the embeddings.)

The object recognition server compares these embeddings to embeddings stored in a database (e.g., the product database) that is updated constantly as new items become available. For instance, it may compute a distance in a multi-dimensional space between a computed embedding, e.g., for a jacket, and the stored embeddings. The second implementation identifies the stored embedding that is closest to the computed embedding as a match. The object recognition server identifies the item (e.g., the jacket) corresponding to the matching stored embedding as the item (in this case, the jacket) and returns the associated product ID or similar information. In some cases, the item identified by the neural network is identical to the object appearing in the video; in other cases, the item identified by the neural network is the closest match (most similar) to the object appearing in the video from among the objects represented by the stored embeddings.

The second implementation of the neural network may also identify the stored embedding(s) with the next-shortest distance(s) as corresponding to similar item(s). If desired, object recognition server may identify these similar items (e.g., similar jacket) and return the associated product IDs or similar information as well for display to the user.

Neural Network Training, Testing, and Validation

A real-time image recognition engine can be implemented via a machine-learning model 303, such as a neural network implemented by CPU, GPU, or other processor. This machine-learning model 303 can be trained, tested, and validated to identify or recognize in real-time, products, items, characters, and other suitable entities displayed on a video. Likewise, the machine-learning model 303 can infer associations between items, characters, and other suitable entities displayed on the video. The machine-learning model 303 can take as input a single video frame or a video segment (video segment defined as a sequence of video frames), and identify a set of items shown in the video. The machine learning model 303 can further infer an association or relationship among the identified set of items, for instance, the machine learning model can infer that a subset of the identified items are worn or carried by a character shown in the video. Accordingly, such a subset can be grouped under a category associated with the character.

The data input into the machine learning model 303 includes images (e.g., 401A and 401B) either whole images or curated images (e.g., cropped images). The curated images can be produced by a human or an automated system. The original images can be sourced from any media content that requires metadata tagging. The model may also have additional metadata input into it to aid in its task, such as whether the image is of a man or woman, or other type of human or non-human entity.

Training

Figure 4A:
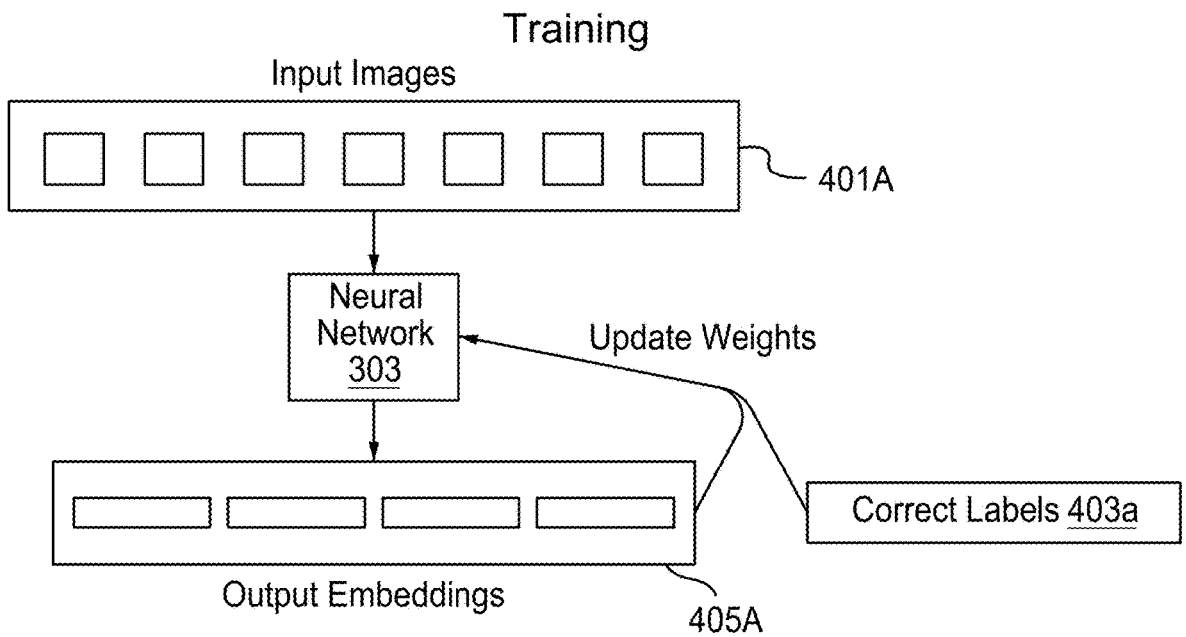
FIG. 4A is a flowchart illustrating training of a machine-learning model to implement a real-time image recognition engine, according to an embodiment.

FIG. 4A illustrates training of the machine-learning model 303. The machine-learning model 303 is trained on training sets of images 401A and associated metadata. The images are manually labeled beforehand with metadata that the model uses to correct itself (FIG. 4—"Correct Labels" 403A). This metadata can include broad categorization, detailed attributes, listings of similar images, text descriptions, etc. The machine-learning model 303 generates output embeddings (e.g., neural network weights) 405A that are fed back into the machine-learning model with the correct labels 403A for training purposes.

Testing and Validation

Figure 4B:
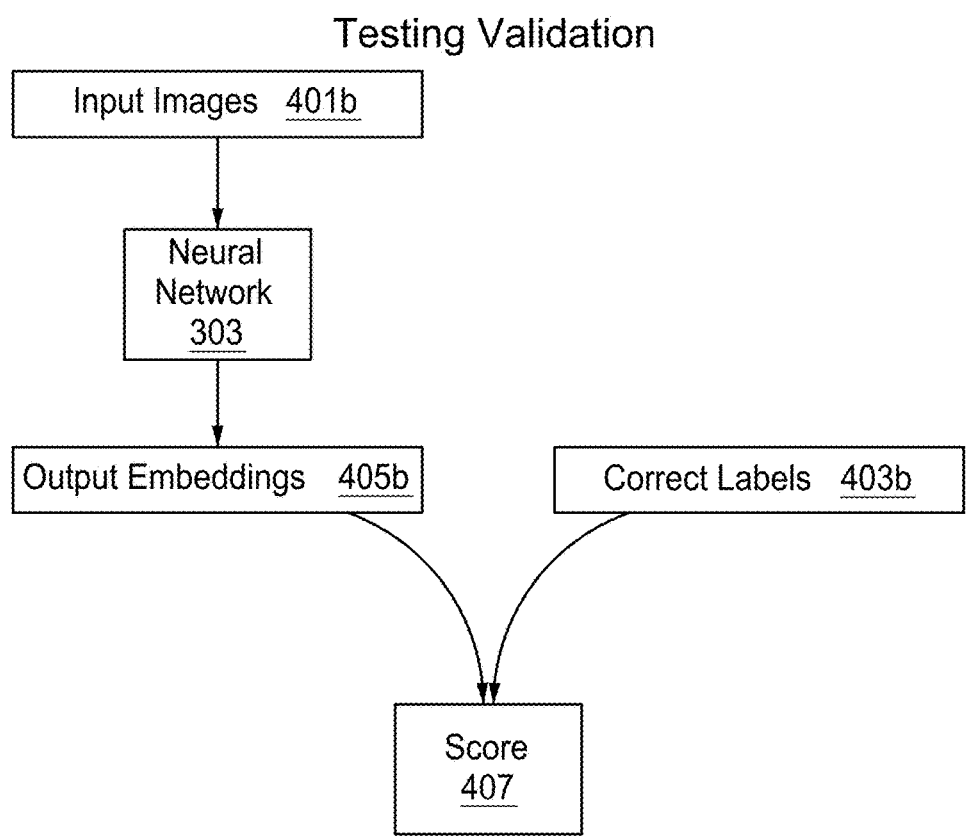
FIG. 4B is a flowchart illustrating testing and validation of a machine-learning model to implement a real-time image recognition engine, according to an embodiment.

FIG. 4B illustrates testing and validation of the machine-learning model 303. The machine learning model 303 is tested on data with the same format as the training set; however it is tested on data points not seen during training (e.g., input images 401B). As in training, the machine-learning model 303 generates output embeddings 405B in response to the input images 401B. These output embeddings 405B are compares to predetermined correct labels 403B for the input images 401B and used to generate a score 407 indicating how well the machine-learning model 303 identified known objects in the input images 401B.

The machine learning model is validated on data with the same format as the training and testing set, however it is only validated on data points not seen during training or testing. Additional, qualitative testing can be done to validate the model, whereby suggested results from the model are shown to human moderators to evaluate for correctness holistically.

Inference of Associations

When properly trained, the model 303 understands associations between products. E.g. These shoes are worn by the same person as this jacket. This can be accomplished through a combination of pre-processing of the images input to the network and post-processing of the output of the network. For example, before being input to the network, images can be segmented by first running another neural network that is trained to detect people. Each of these segmented regions can then be input into the machine learning model separately, and their outputs associated with each other. To associate these regions across frames, facial recognition can be employed to match regions to each other. In cases where faces aren't visible, alternative heuristics can be used, such as evaluating spatiotemporal similarities between regions, and calculating similarity between regions using the output of the machine learning model.

Outputs

Figure 5:
FIG. 5 is an example of bounding boxes produced by the real-time image recognition engine over a video frame, according to an embodiment.

The output of the machine-learning model is a set of bounding boxes (e.g., bounding box 501 shown in FIG. 5) enclosing different items, in addition to a numerical embedding of each item e.g., 405B. These outputs are then combined with the pre- and post-processing discussed above to produce a final listing of all the outfits present in the media grouped by character.

Overlaid Video Player User Interface

The Overlaid Video Player provides a way for consumers of video content to know what products appear in a video in real time, as they watch the video. It can be implemented using the systems shown in FIGS. 1A, 2, and 3 and the methods illustrated in FIGS. 1B, 4A, and 4B. In operation, the Overlaid Video Player displays metadata about one or more objects appearing in the video in response to a command or query from the user as described below with respect to the interfaces shown in FIGS. 6-12.

Figure 6A:
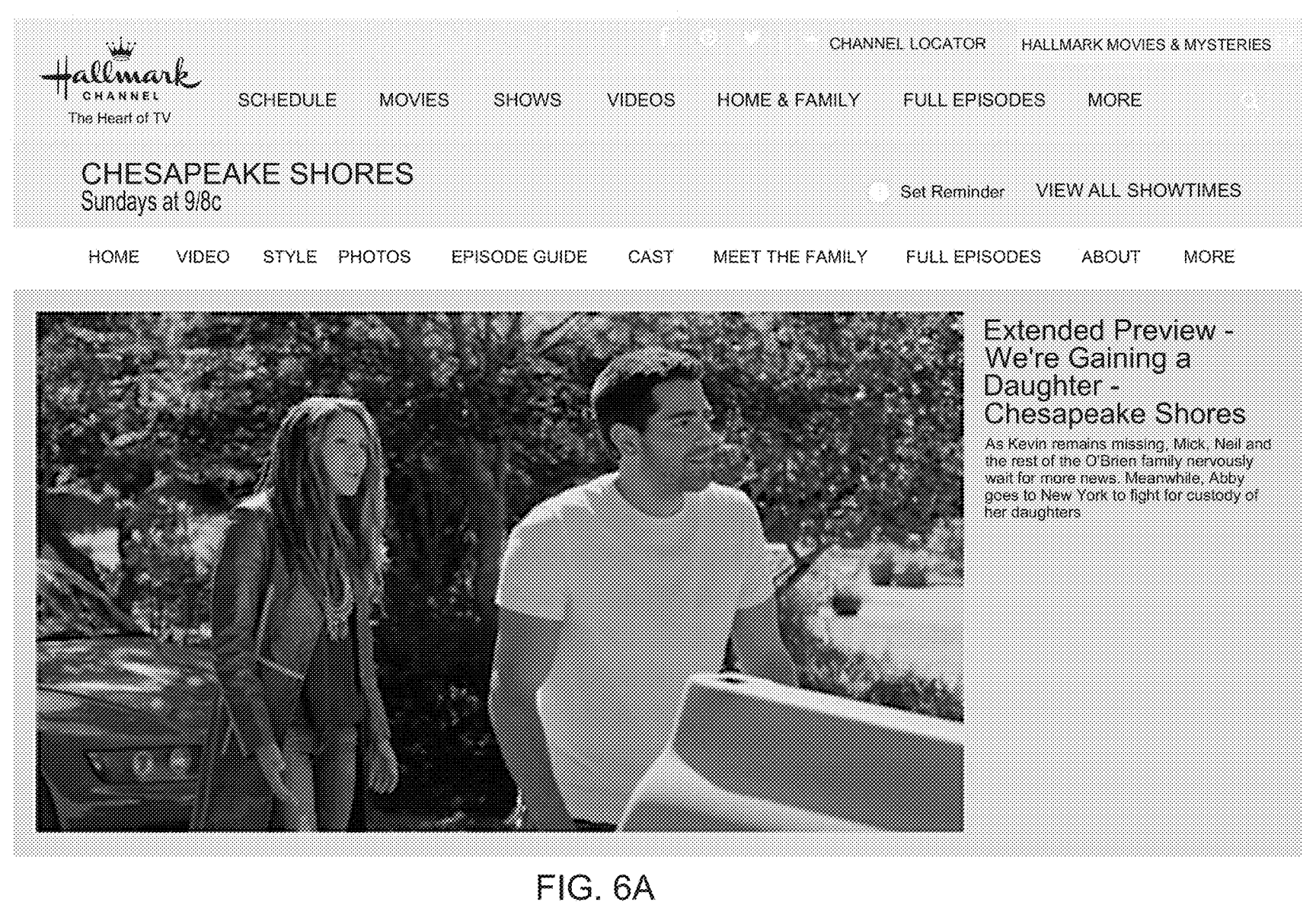

As an example, the Overlaid Video Player can be implemented on a television show's website (e.g., video shown at 6A), where users are able to watch clips and full-length videos of their favorite shows. The television studio has added the code to enable the Overlaid Video Player, and the user arrives on a page with the player on it (FIG. 6A). The video begins playing automatically or when the user clicks the play button (not shown in FIG. 6A).

Figure 6B:
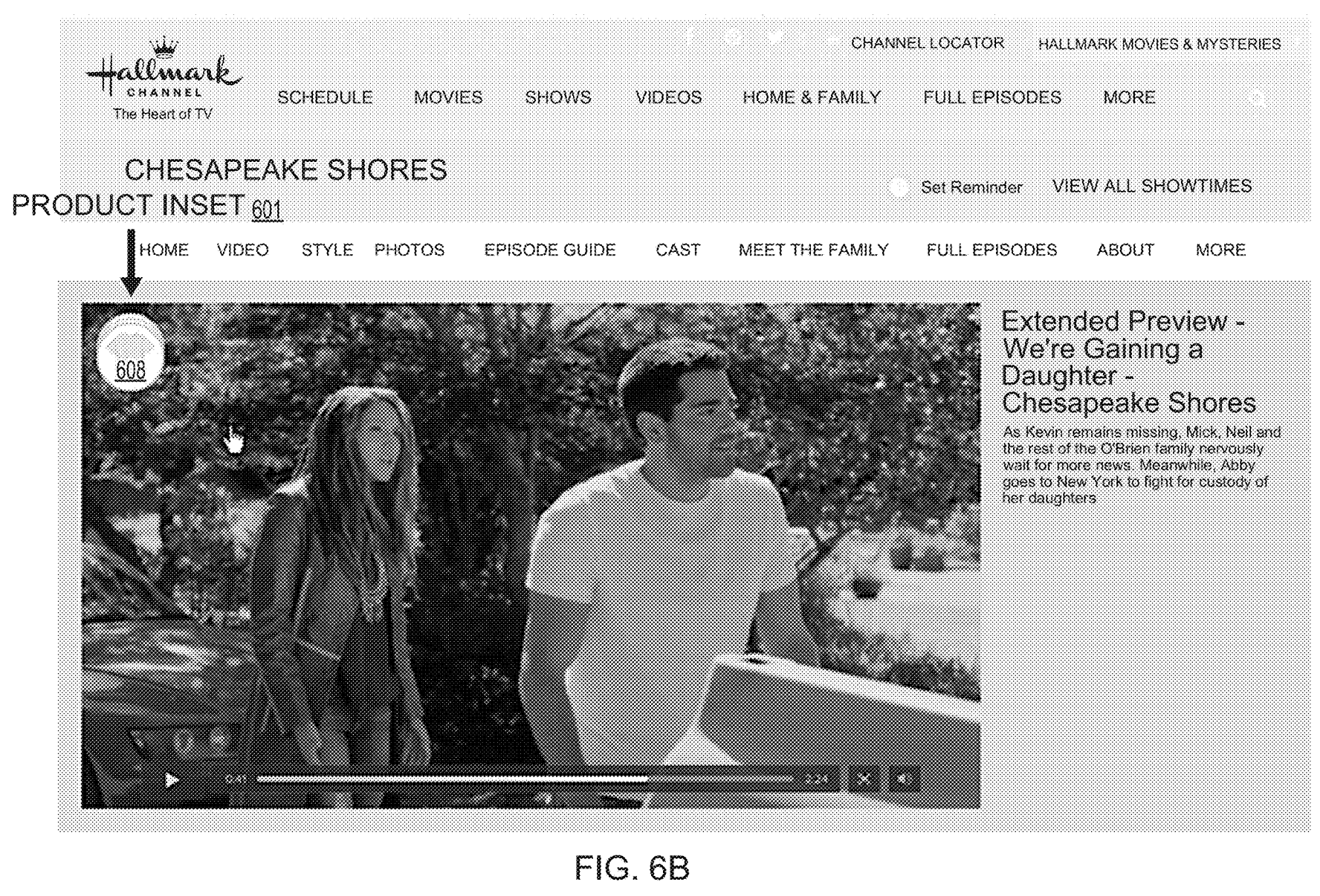

When the user moves their cursor into the video player area, the Product Inset 601 appears, overlaid on the video area or next to the video area (FIG. 6B). On devices that do not have a cursor (mobile apps, for example), pausing the video or a specific keypress can invoke the Product Inset. Alternatively, on any kind of device, the Product Inset can be set by the Content Provider (in the code) to appear at all times so it does not need to be invoked by a user.

The Product Inset displays product images in real-time to match a product appearing in the frame at the corresponding time in the video. To make this possible, prior to enabling the shopping feature, the relevant product information is added to a database in the Metadata server by the Metadata Provider. In the database, every frame of the video (or every frame at a set interval, e.g., every 15$^{th}$ frame) can be associated with the products (and corresponding product information, such as images, price, purchase link, etc.) that appear in the given frame. The timestamp for when the frame (and products) appears in the video is also kept in the database, so that the code can display the products in real-time. In this example, the t-shirt worn by the male character can be seen in the Product Inset. The Product Image does not have to be an actual image of the product; it can be anything to represent the product seen on screen (e.g., text, an icon, or a drawing). In this example, while the video is playing, only one product image is shown at a time in the Product Inset. If there is more than one product in the frame, the other products are stacked below the first product and partially hidden from view.

In this example, the Product Inset shows only one product that appears in the current video frame—when the video is playing and the product in the inset no longer appears in the current frame, it changes to a product that appears in the new frame. For example, if the male character in the white t-shirt no longer appears in the frame, the t-shirt may no longer appear in the Product Inset. The code recognizes which frame/what time the video player is playing, and can pull the appropriate frame's product information from the database and display it on screen. Being that not every single frame in a video is added to the database (it could be every 12 frames, for example), the product shown in the product inset for a given frame can be the product information for the closest, previous, or next frame that has product information tied to it. If there are no products in the current frame, the Product Inset does not show any product images. Alternatively, the last product image shown can remain in the Product Inset until a new product appears in the frame and replaces the previous product—this would ensure there is always a product appearing in the Product Inset.

Figure 6C:
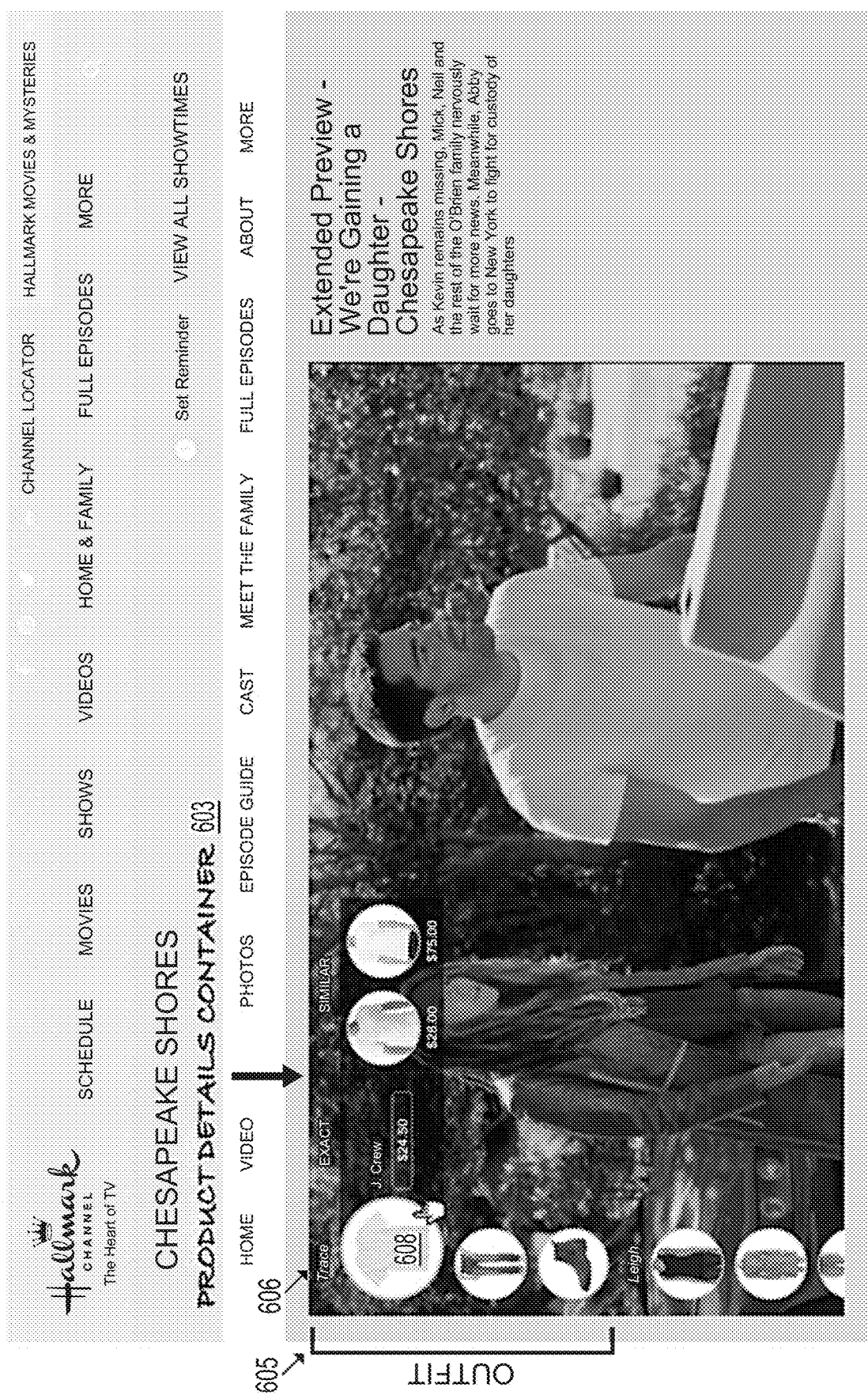

The user can interact to see the products in the frame. This can be done by hovering (on desktop devices) the cursor on the Product Inset 601, clicking/tapping on the video itself, or clicking on a dedicated button that enables shopping. The hidden stacked products are expanded and made visible (FIG. 6C). The expanded products can be grouped by outfit (e.g., 605) with an actor or character name (e.g., 606) above each group. In this example, hovering over the t-shirt 608 product image has expanded the products to show his full outfit at 605 including a t-shirt, jeans, and boots. Below his outfit, you can see another character's (Leigh's) top and jacket, and scrolling down will reveal the rest of her outfit.

The topmost product 608 (the t-shirt) expands to show the corresponding Product Details Container 603. The Product Details Container 603 displays details about that product, and can also include one or more alternate products. This information can be stored in the Metadata database. In this example, the t-shirt 608 is by J. Crew and costs $24.50, and there are two alternate t-shirt products shown, with different prices. Details for the product and alternate products can include: product image, brand name, product name, price/stock status, retailer name, designer name, product type or description. It may also include a label to denote whether the product is an exact or close match to the product shown in the video (in this example, the J. Crew t-shirt is an exact match). It may also include a call to action button to purchase or get more information about the product or alternate products, or to add to a virtual shopping cart (in this case, a button with a price on it is shown, for purchasing the product). The alternate product(s) can be a similar product (like the two similar t-shirts in the example), the same product from a different retailer, a related product or an arbitrary product.

In some examples, all of the product information data is added to the database in advance. Some parts of the data can be dynamically generated and added to the Metadata database. For example, image recognition can be used to identify products in the frame and provide the closest match, selected from another internal database of products or retailer APIs. The alternate products could also be retrieved from a third party API (or internal system) that selects alternate products automatically based on various properties (e.g., name, color, price, UPC number, etc.). Other attributes for the product and alternative products, such as pricing and in-stock data, can also be dynamically updated on the Metadata database.

Figure 6D:
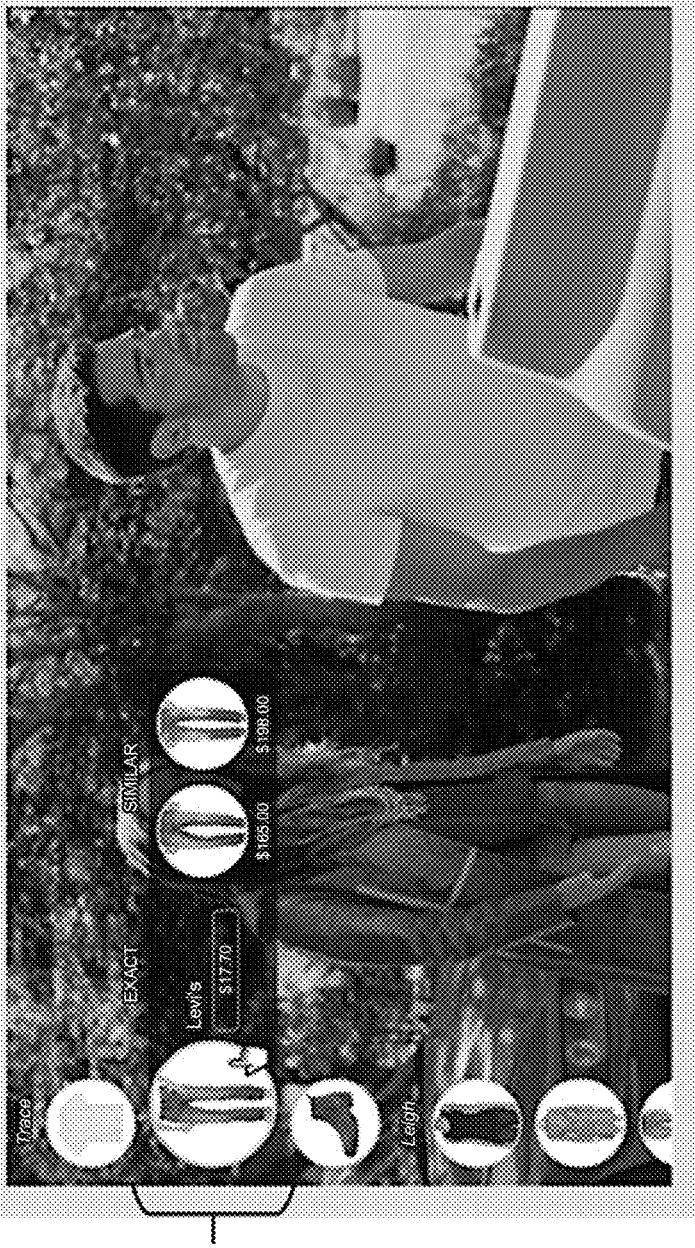
Figure 6E:
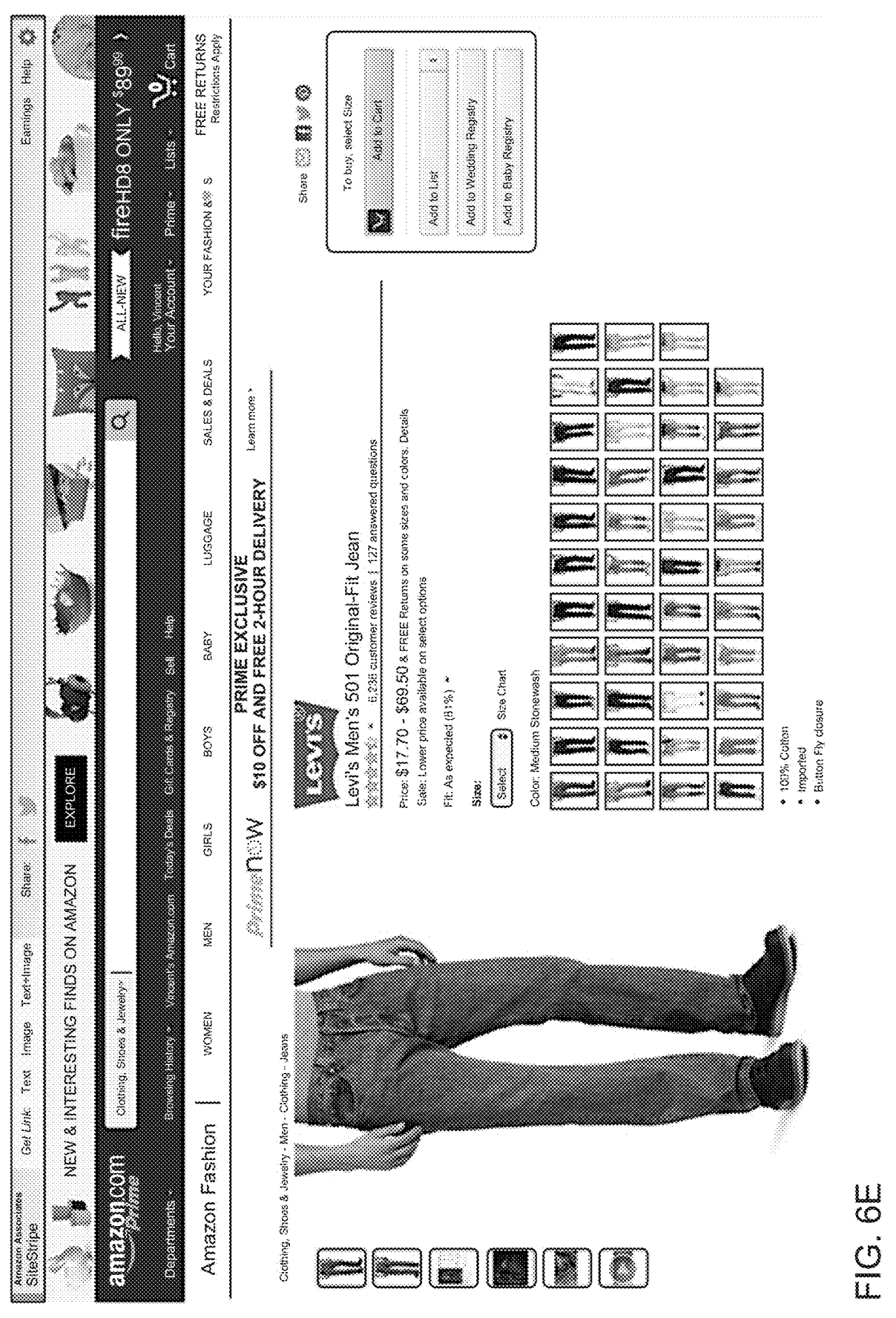
Figure 6F:
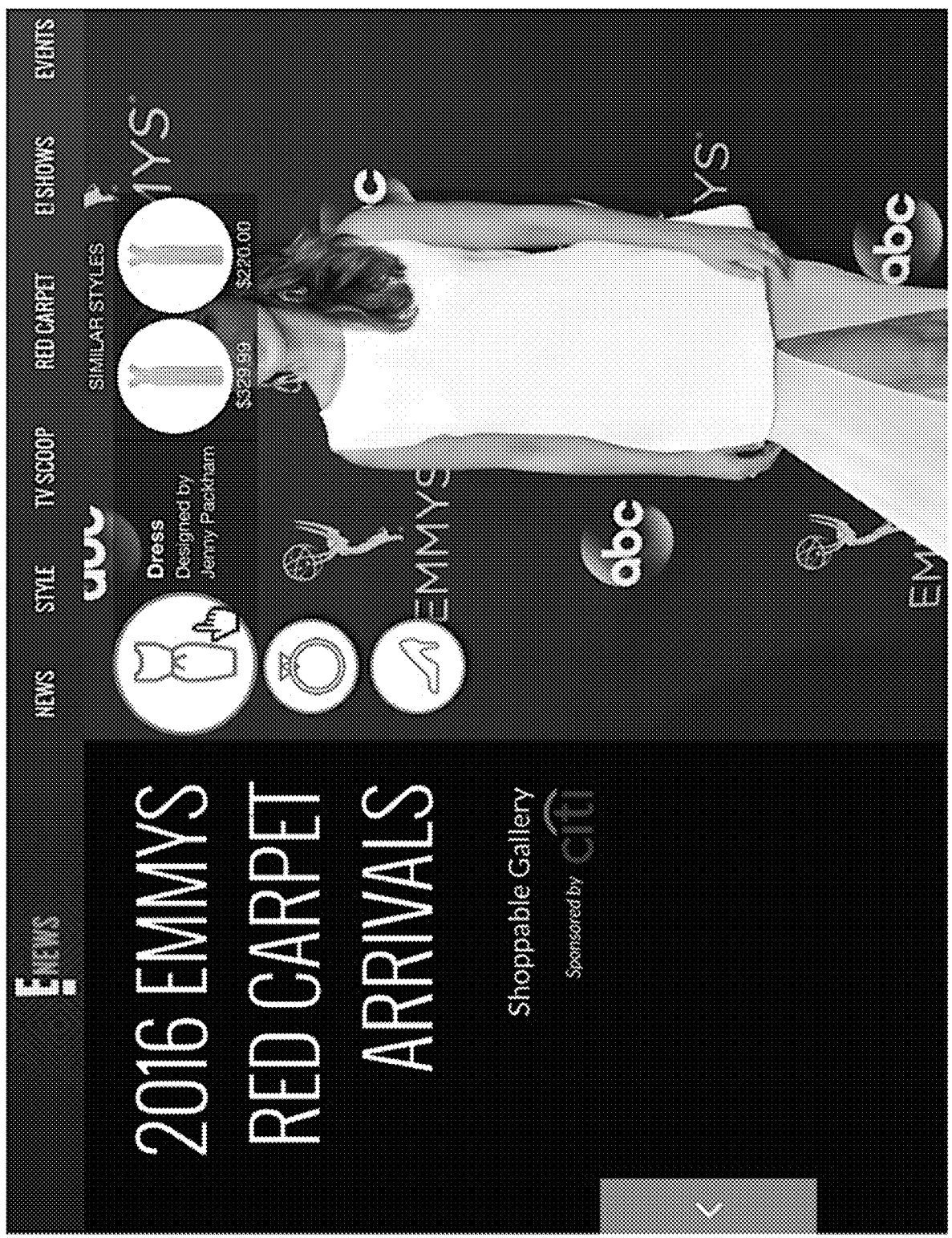

When the user hovers/taps on another product image, any open Product Details Container will be hidden and the new corresponding Product Details Container becomes visible (e.g., at 607 in FIG. 6D). In this example, the user has hovered onto Trace's jeans, and information about the jeans is displayed.

If the expanded products extend past the bottom of the video player, they can scroll to show more. On desktop this can be accomplished using the scroll wheel on the mouse or trackpad, or by moving the cursor to the bottom of the video player, and the expanded products will move upwards. On mobile, the user can drag the product images up and down to see more. On both platforms, the interface could also have up and down arrows above and below the expanded products list that can be clicked/tapped to scroll.

The expanded products may also show products or outfits from previous frames below the products from the current frame. This is something that the Content Provider or Third Party Overlaid Video Service can choose to set in the code. This allows users to view previous outfits without having to seek backwards to that specific frame. This is useful when there are not many products in a video, but can get confusing when there are many.

In another variation for the Product Inset, rather than only showing one product image with the other products hidden from view, the Content Provider or Third Party Overlaid Video Service may set the code to expose more than one (or all) of the product images for the frame in the Product Inset. The Product Inset with more than one product image in it can be visible at all times during video playback, or can be made visible when pausing the video in the ways mentioned above.

Clicking/tapping on the elements of the Product Details Container can open a third party website to purchase or get more information about the product or alternate products (FIG. 6E). In this example, clicking on the $17.70 button sends the user to Amazon.com, where they can purchase the jeans.

The Product Details Container collapses when the user hovers away from it (on desktop) or taps outside of the container (on mobile), or clicks/taps on the Play button (if the video is currently paused) and then the products in the Product Inset collapse into a stack to only show one product (FIG. 5B). The Product Inset disappears after the mouse has been inactive over the video player (or the user does not tap on the video) for a defined period of time. Alternatively, the Product Inset can persist and stay visible. If the video was in a paused state before the initial hover/tap on the Product Inset, then video remains paused.

The Overlaid Video Player interface can be adapted to still images or animated gifs as well—this could be a promotional or set image for a television show or movie, a photo of any person or celebrity, or a street fashion photo. In this example (FIG. 6F), a fashion gallery has been made using the interface.

Adjacent Layout

The Adjacent Layout is another interface that provides a way for consumers of video content to know what products appear in a video. Whereas the Overlaid Video Player interface is located inside the video player, the Adjacent Layout is typically located outside of the video player. It is a combination of still images and details about the products that appear in those images. The experience is different for desktop and mobile users. Like the Overlaid Video Player, the Adjacent Layout interface can be implemented using the systems shown in FIGS. 1A, 2, and 3 and the methods illustrated in FIGS. 1B, 4A, and 4B.

Desktop Experience

Figure 7A:
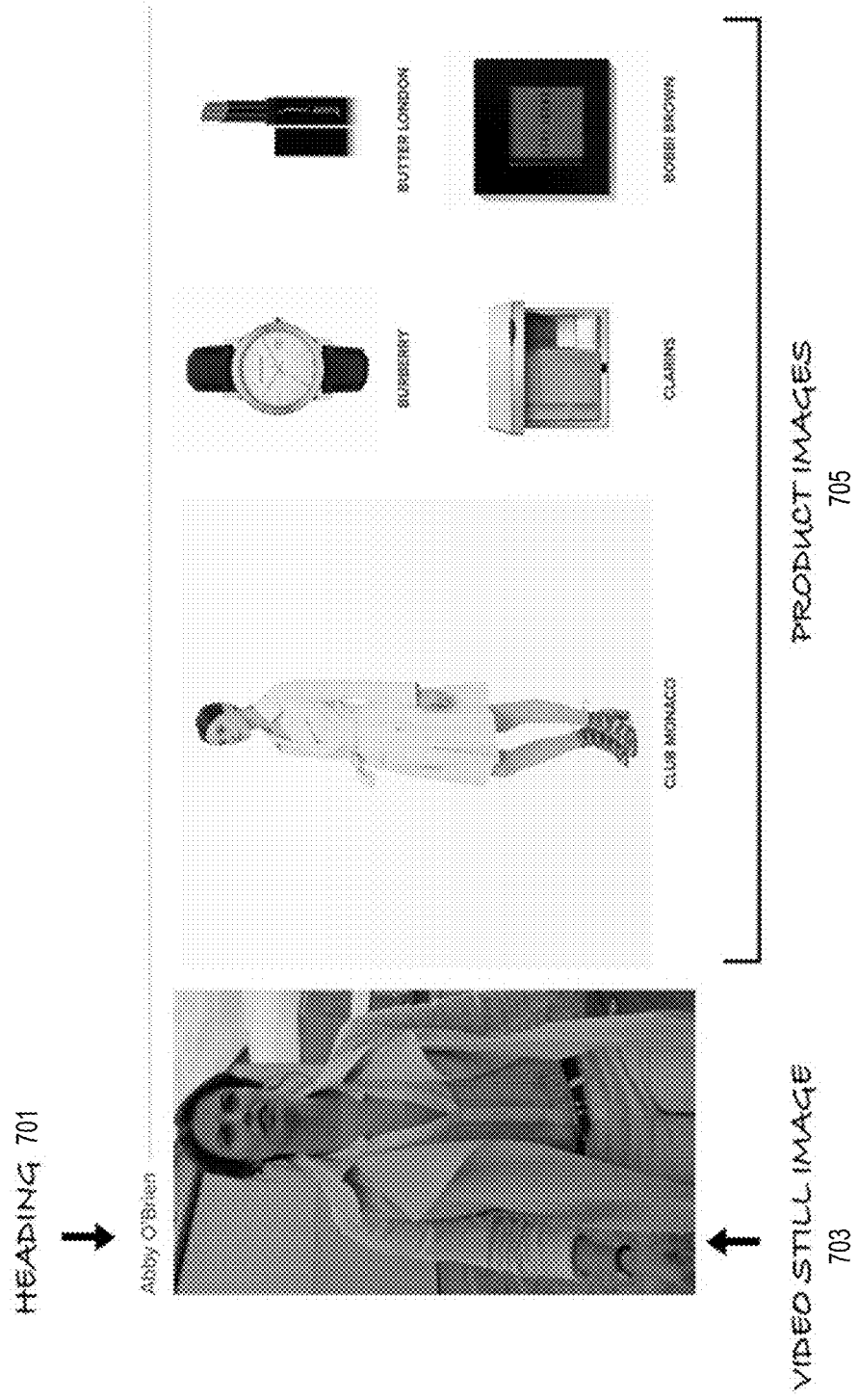

As an example, the Adjacent Layout could be implemented on a television show's website, where users are able to watch clips and full-length videos of their favorite shows. The television studio has added the code to enable the Adjacent Layout, and the user arrives on a page with the Adjacent Layout on it (FIG. 7A). This may also be a page that has the Overlaid Video Player interface on it—the two user interfaces can be used on the same page. The Adjacent Layout shown in FIG. 7A includes a video still image 703 extracted from a video frame. The real-time recognition engine 209 (shown in FIG. 2) recognizes that the character is "Abby O'Brien" and display her name on heading 701. Likewise, the real-time recognition engine 209 can determine the outfit a "Abby O'Brien" is wearing and display the outfit items in a product images section 705.

Figure 7B:
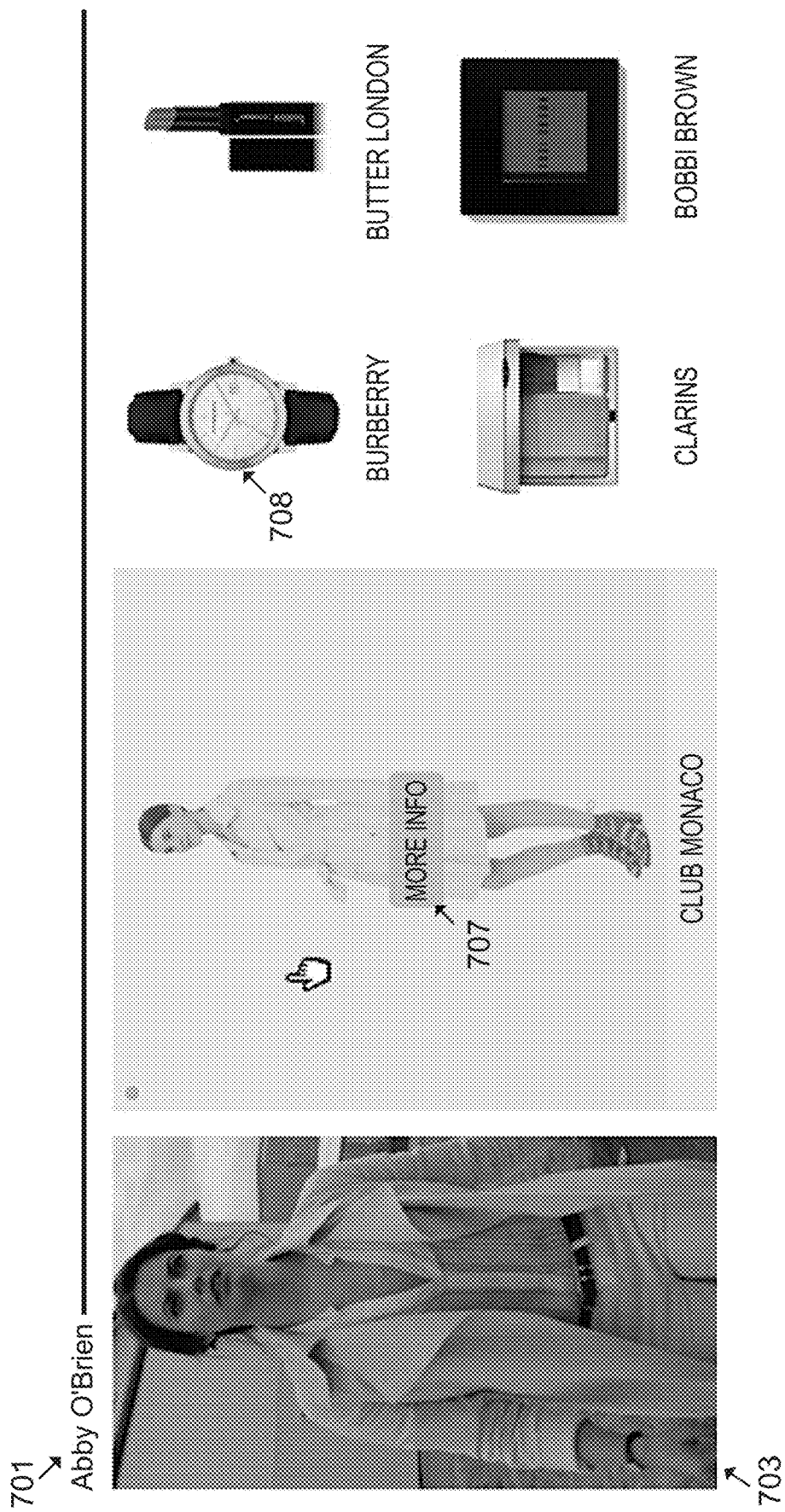
Figure 7C:
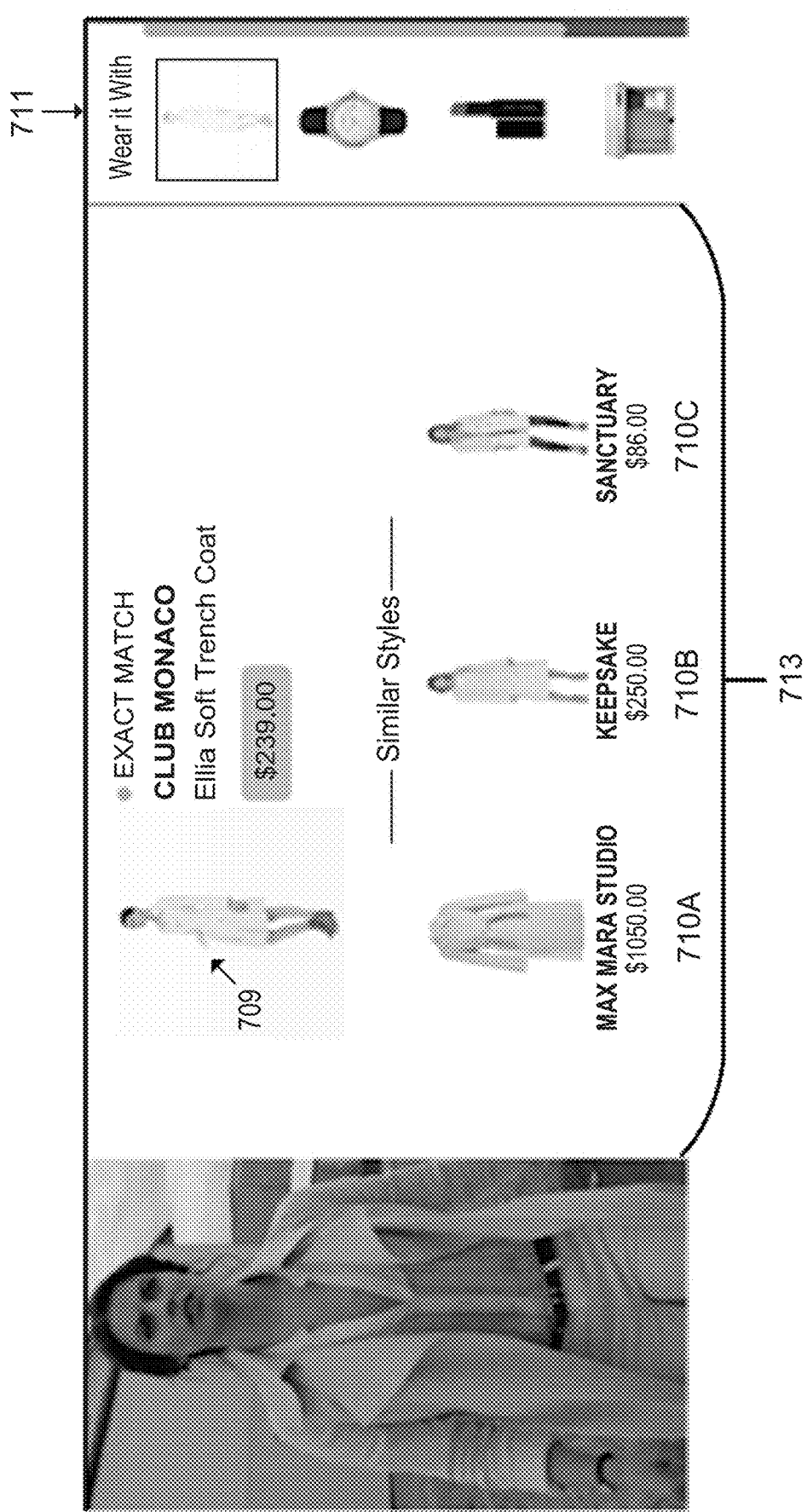

One or more Outfits are displayed on the page (FIG. 7B). Each Outfit includes an Outfit Image. This can be a still image derived from the video frame (cropped or not cropped)—in the example it is a cropped video still (shown at 703) of one of the characters. However, it can be any kind of image (or short video clip/animated gif) with one or more products in it. For example, a promotional or set image for a television show or movie, a photo of any person or celebrity, or a street fashion photo. Each outfit also includes a set of Product Images related to the respective still image e.g., Burberry watch 708. The Product Images can also include some or all of the following information: brand name, product name and price/stock status. In this instance, the product images are shown with brand names below them. In some other instances, each product image can have a label depicting whether the product is an exact or close match to the actual product seen in the Outfit Image. It may also include a call to action button to purchase or get more information (e.g., 707) about the product or alternate products, or to add to a virtual shopping cart. In addition to these elements, a heading can be placed above each outfit, with information that includes the actor name, character name, video name, show name, season and/or episode—in this case the character's name, Abby O'Brien, is included at 701.

Hovering over a Product Image can invoke an overlay with a button to click for more information about that product (FIG. 7B). In this example, hovering on the Club Monaco coat reveals a More Info button 707. Alternatively, clicking directly on the Product Image can have the same functionality. Both of these actions cause a Product Details Box to appear.

The Product Details Box 713 (FIG. 7C) displays additional details about the selected product (the Club Monaco coat 709 in this example). It includes some or all of the following information: brand name, product name, retailer name, designer, product type, description, price/stock status and exact/close match label. It may also include a call to action button to purchase or get more information about the product, or to add to a virtual shopping cart. In this example, the call to action is a button with the $239.00 price on it.

The Product Details Box 713 may also include one or more alternate products e.g., 710A, 710B, and 710C. Details for the alternate products can include: product image, brand name, product name, price/stock status, retailer name or description. It may also include a call to action button to purchase or get more information about the alternate products, or to add to a virtual shopping cart. The alternate product(s) can be a similar product, the same product from a different retailer, a related product (e.g., 711) or an arbitrary product. In this example, three similar styles are shown as alternate products.

Figure 7D:
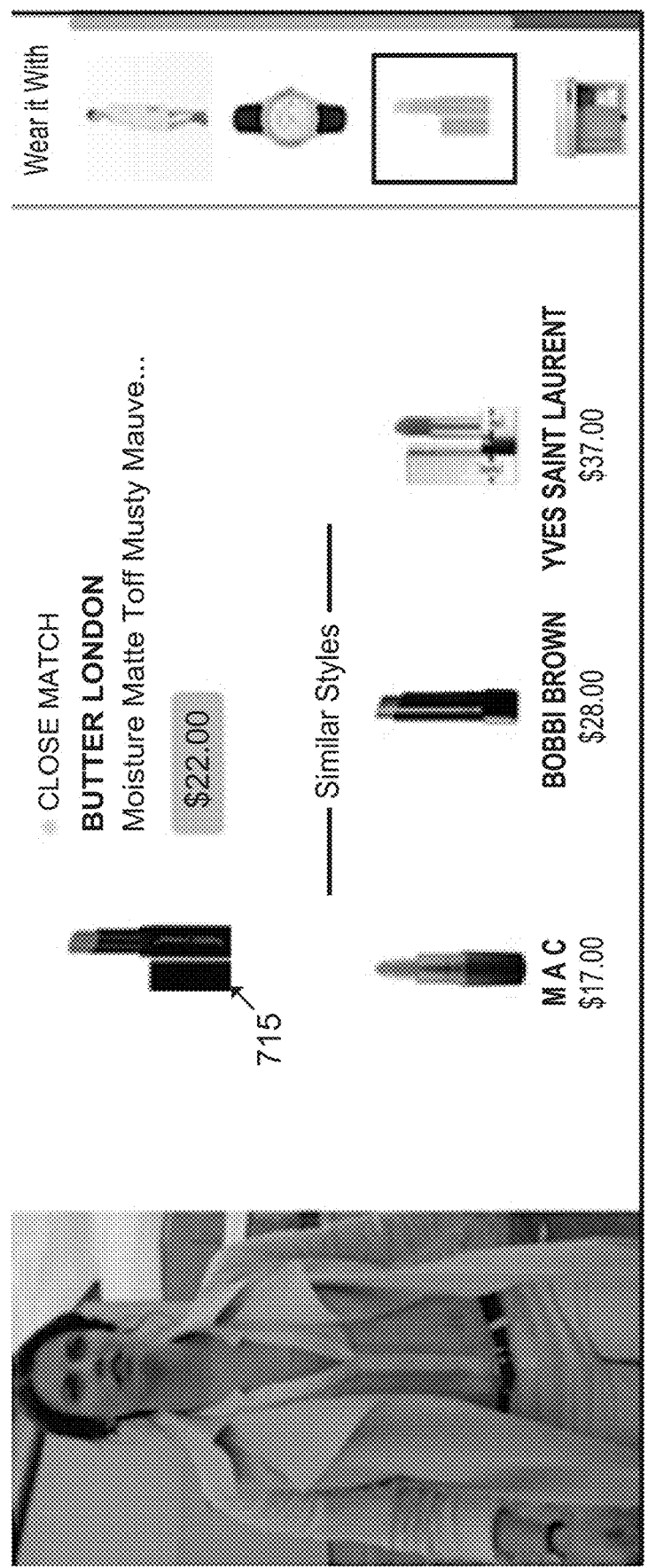

When the Product Details Box opens, the Outfit Image may remain visible, to provide context for the products in the outfit. It may also include images of the other products from the outfit. In this example, these are shown on the right side of the Product Details Box. The coat is faded out since it has been selected, and users can click on the other products from the outfit. Clicking on another product from the outfit replaces the product information (including alternate products) with the information related to the newly selected product (FIG. 7D). In this example, the user has clicked on the lipstick 715, and the information for that product has replaced the information about the coat.

Figure 7E:
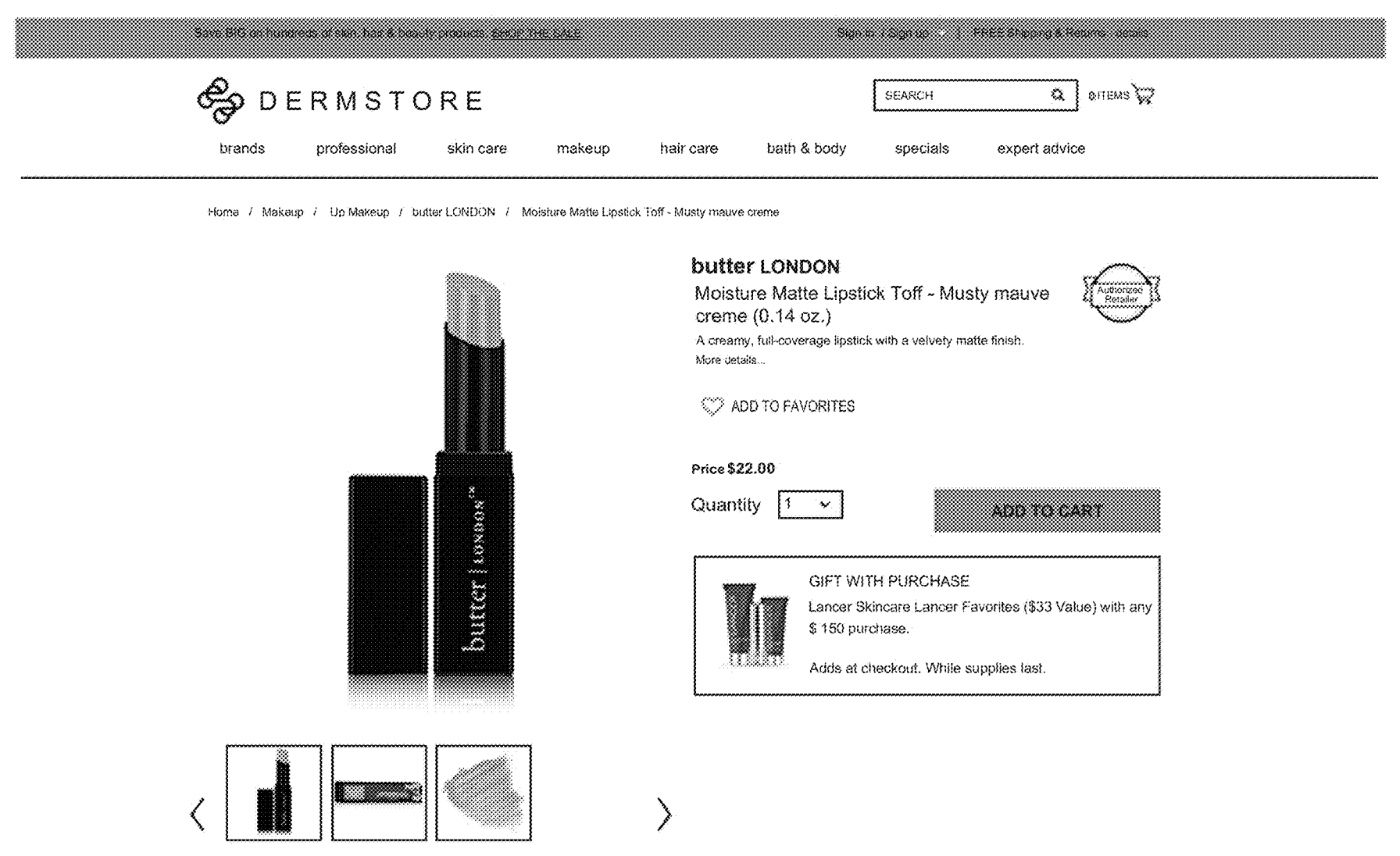

Clicking on the elements in the Product Details Box can open a third party website to purchase or get more information about the product or alternate products (FIG. 7E). In this example, the user has clicked on the button for the lipstick close match, leading them to complete the purchase on the Dermstore website.

Figure 7F:
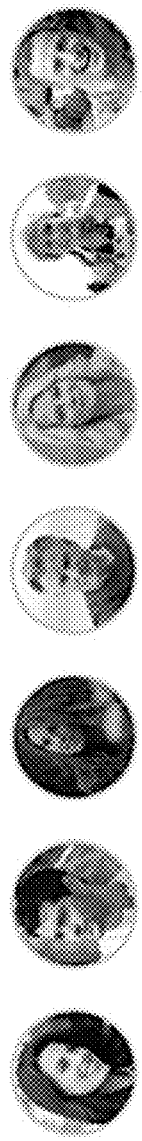
Figure 7F:
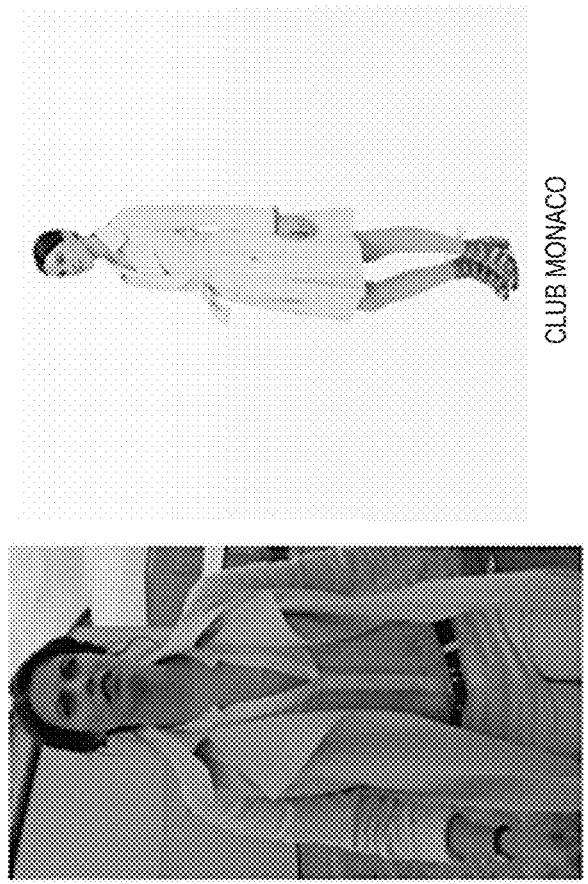
Figure 7F:
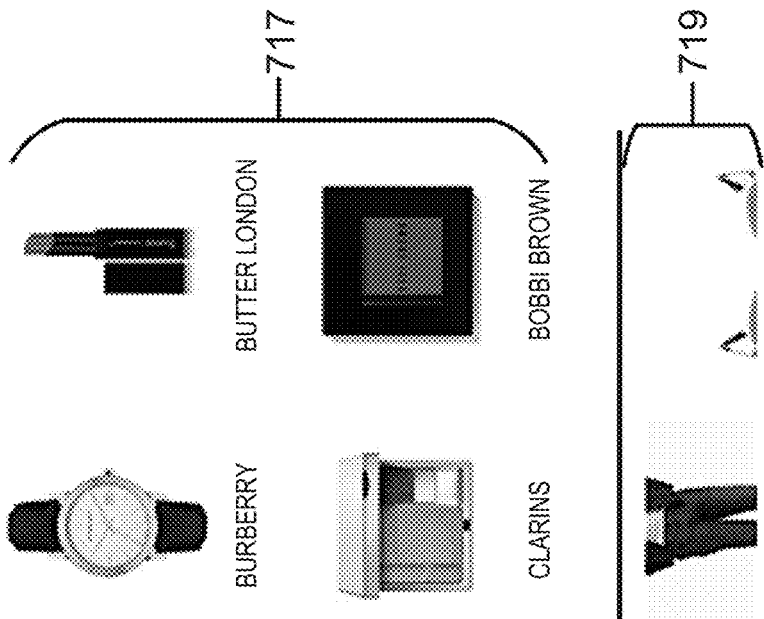
Figure 7F:
Figure 7G:
Figure 7G:
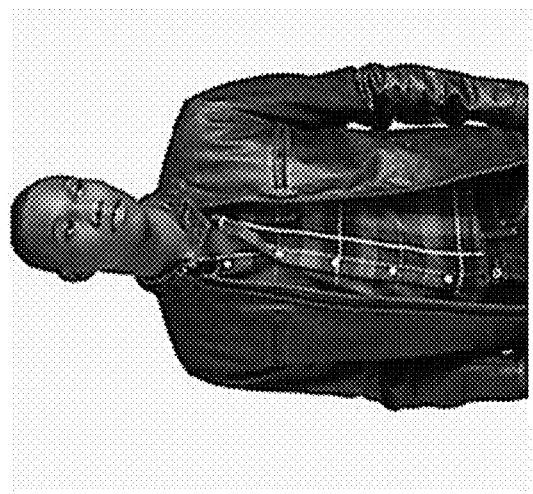
Figure 7G:
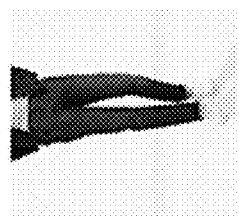
Figure 7G:
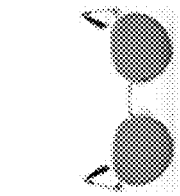
Figure 7G:
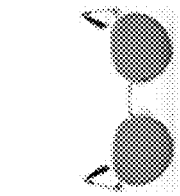
Figure 7G:
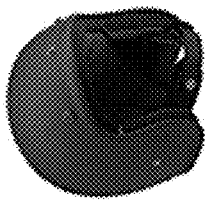
Figure 7G:
Figure 7G:
Figure 7G:

In a more complex implementation of the Adjacent Layout, more than one outfit may be displayed on the same page (FIG. 7F). In this example Abby's outfit 717 with the coat is displayed first, with an outfit 719 from Trace below it. When more than one Outfit is displayed, the user may have the option to filter the Outfits by various different attributes, including actor), character, movie, show, episode and fashion category. In this example, if the user clicks on Trace's image 721 at the top of the window, it filters the Outfits by only outfits that belong to him (FIG. 7G).

Mobile Experience

An alternative design for the Adjacent Layout is typically used for mobile devices. As an example, the Adjacent Layout mobile experience could be implemented on a television show's website or software application, where users are able to watch clips and full-length videos of their favorite shows. The television studio has added the code to enable the Adjacent Layout, and the user arrives on a page with the Adjacent Layout on it (FIG. 8A). This may also be a page that has the Overlaid Video Player interface on it—the two user interfaces can be used on the same page.

One or more Outfit Cards (FIG. 8A) are displayed on the page. Each Outfit Card includes an Outfit Image 801, which in this example is a cropped still image derived from the video frame (cropped or not cropped), but could be any image. It also includes a navigation section that includes two types of buttons: an Outfit Image Button 801 and one or more Product Image Buttons 803. When first loading the Outfit, the Outfit Image Button is selected, to denote that the Outfit Image is being displayed.

Figure 8B:
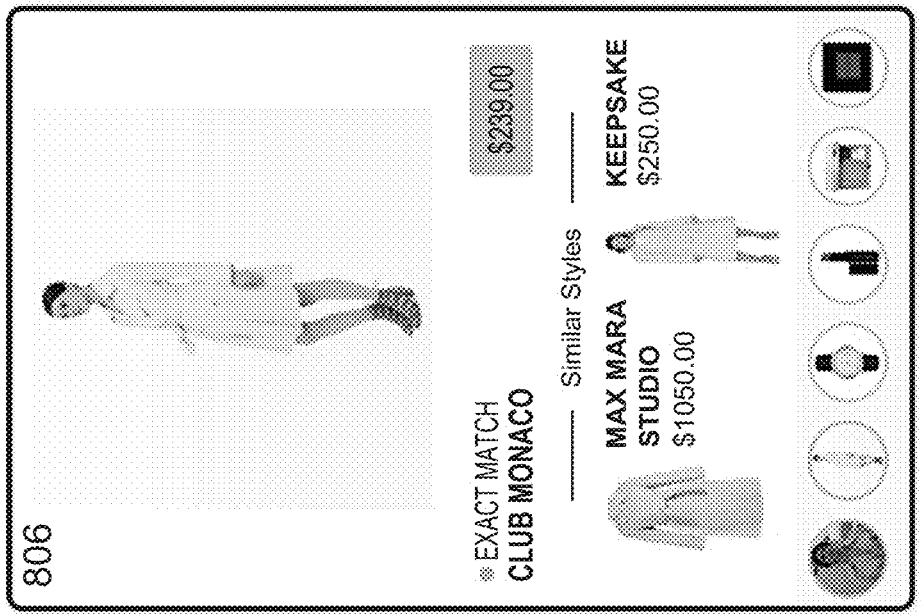
FIGS. 8A-8E illustrate using an Adjacent Layout interface on a mobile device (e.g., a smart phone), according to an embodiment.
Figure 8A:
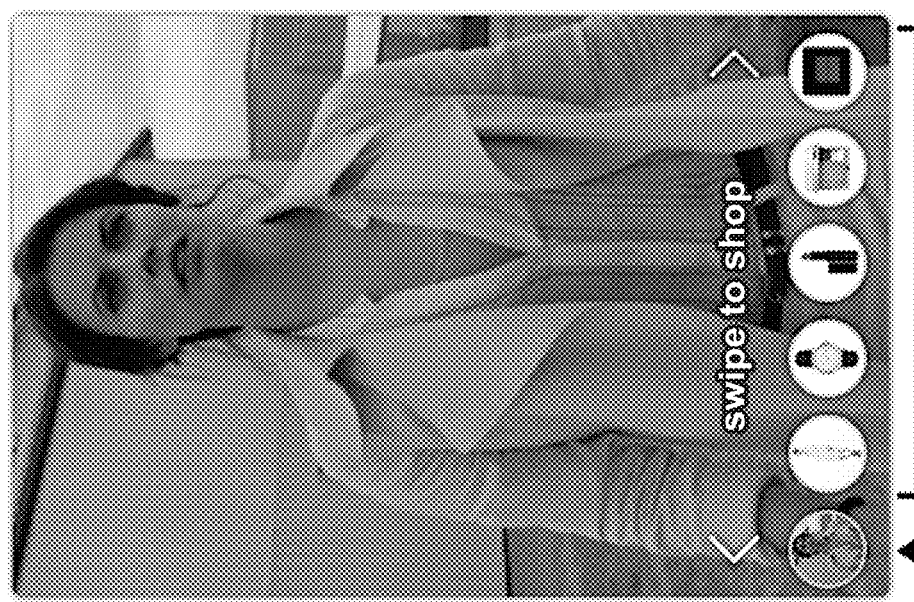

Tapping on a Product Image Button at 805 will replace the Outfit Image with the respective Product Details Card 806 (FIG. 8B). The Product Details Cards can also be accessed by swiping left or right on an Outfit, which will navigate sequentially through the Product Details Cards, looping back to the Outfit Image after it reaches the last Product Details Card. In this example, the user has tapped on the first Product Image Button, the coat, which then loads the coat information as a Product Details Card 806.

The Product Details Card displays details about the selected product. It includes some or all of the following information: brand name, product name, retailer name, designer, product type, description, price/stock status and exact/close match label. It may also include a call to action button to purchase or get more information about the product, or to add to a virtual shopping cart. In this example, a button with the $239.00 price is included. It may also include one or more alternate products. Details for the alternate products can include: product image, brand name, product name, price/stock status, retailer name or description. It may also include a call to action button to purchase or get more information about the alternate products. The alternate product can be a similar product, the same product from a different retailer, a related product or an arbitrary product.

Figure 8C:
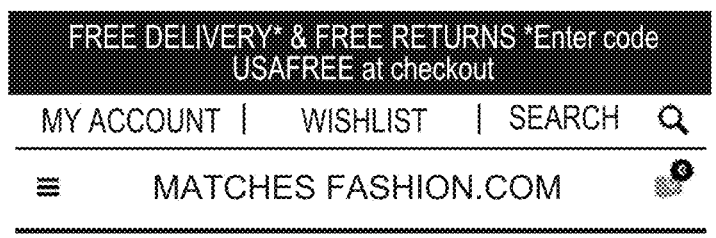
Figure 8C:

Clicking on the elements in the Product Details Box can open a third party website to purchase or get more information about the product or alternate products (FIG. 8C). In this example, the user has clicked on the $1,050.00 price button for the coat, which has opened the matchesfashion.com website to complete their purchase.

Figure 8E:
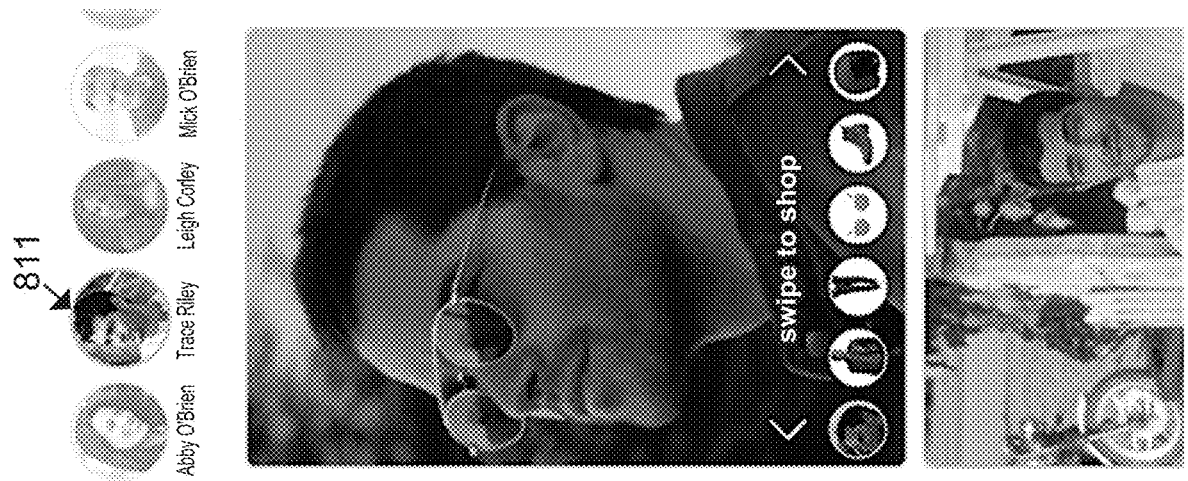
Figure 8D:
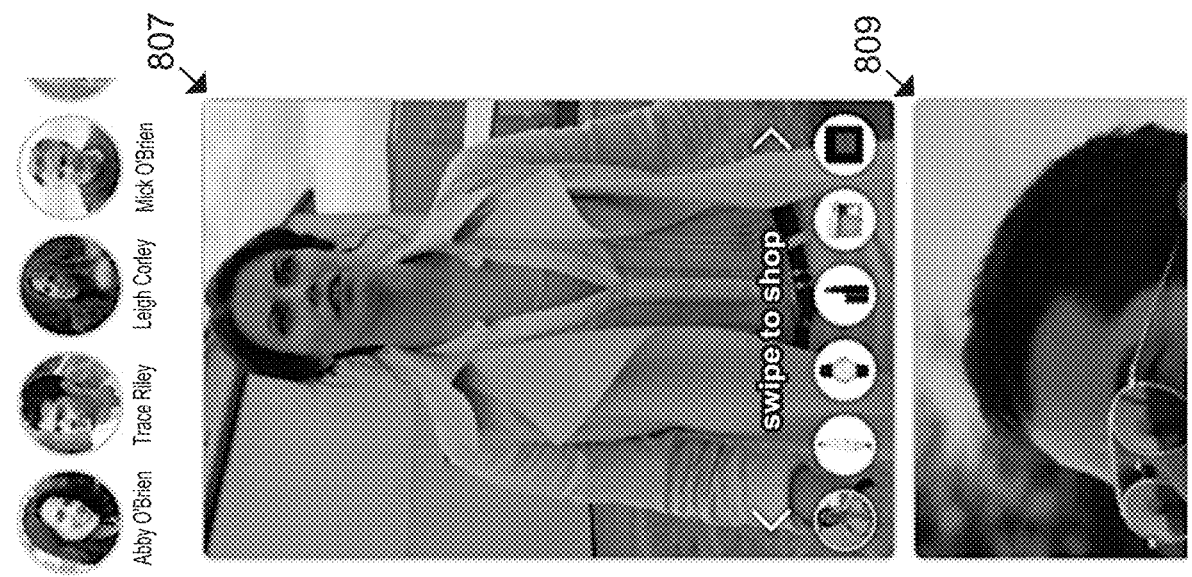

One or more Outfits may be displayed on the page (FIG. 8D). In this example Abby's outfit 807 with the coat is displayed first, with an outfit 809 from Trace below it. When more than one Outfit is displayed, the user may have the option to filter the outfits that are displayed. Outfits could be filtered by various different attributes, including actor, character, movie, show, episode, fashion category. In this example, if the user taps on Trace's image 811 at the top of the window, it filters the Outfits by only outfits that belong to him (FIG. 8E).

General Integration (Desktop and Mobile)

The Adjacent Layout can be displayed on various pages. It can be displayed on the same page as an Overlaid Video Player—typically below the video. It can be displayed on the same page as a regular (non-) video. Or it can be displayed on a page without a video player.

Figure 9A:
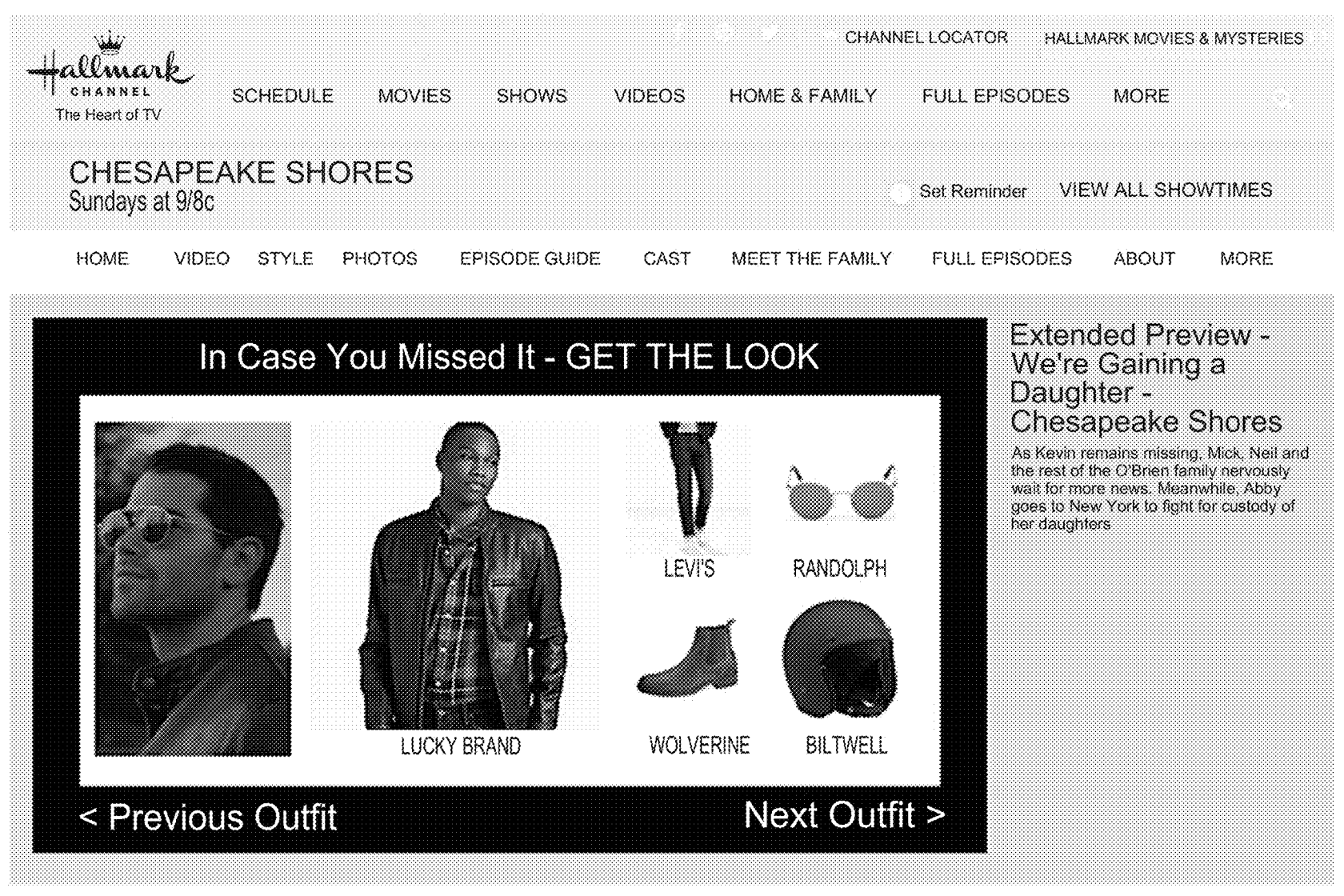

The Adjacent Layout can also be integrated within other types of Video Players. One or more Outfit can be displayed within the video player, at a specific time during the video—typically before or after a video advertisement, or at the end of the video (FIG. 9A). In this example, one of Trace's outfits is displayed at the end of the video. This is useful if the user didn't want to shop during the video and would rather shop at the end. The user can use the Next and Previous buttons to view more outfits from that video.

Figure 9B:

Another version of the Adjacent Layout integrated within the video player is Dual View Shopping (FIG. 9B). At any time during video playback, the video can be made to enter this view. The viewing area is split into two areas—one area shows the video player and the other area shows an Adjacent Layout. Dual View Shopping can be invoked at a set time in the video, or it can be invoked by the user by clicking/tapping on a dedicated button on the video. In this example, the video appears on the left side, with the shopping on the right side. One use case is to automatically invoke Dual View Shopping during the credits at the end of a video, when a user is watching the video full-screen on their desktop device. The credits and video can continue to play while the user shops using the Adjacent Layout, or it can be paused.

Interface for Desktop and Mobile Applications

Figure 10A:
FIGS. 10A-10C illustrate an interactive interface that overlays metadata on video content displayed on a desktop or mobile device, according to an embodiment.
Figure 10B:
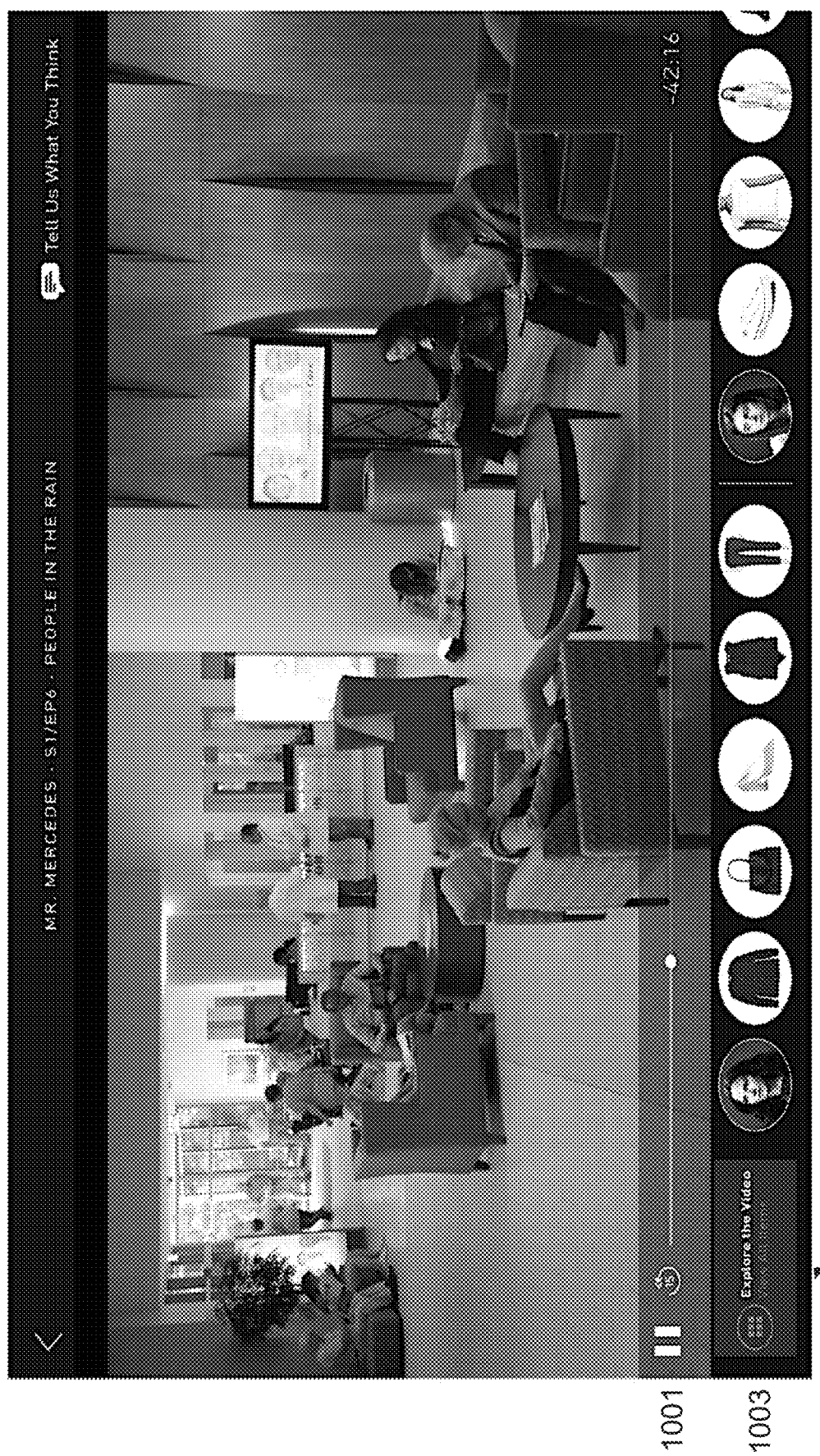
Figure 10C:
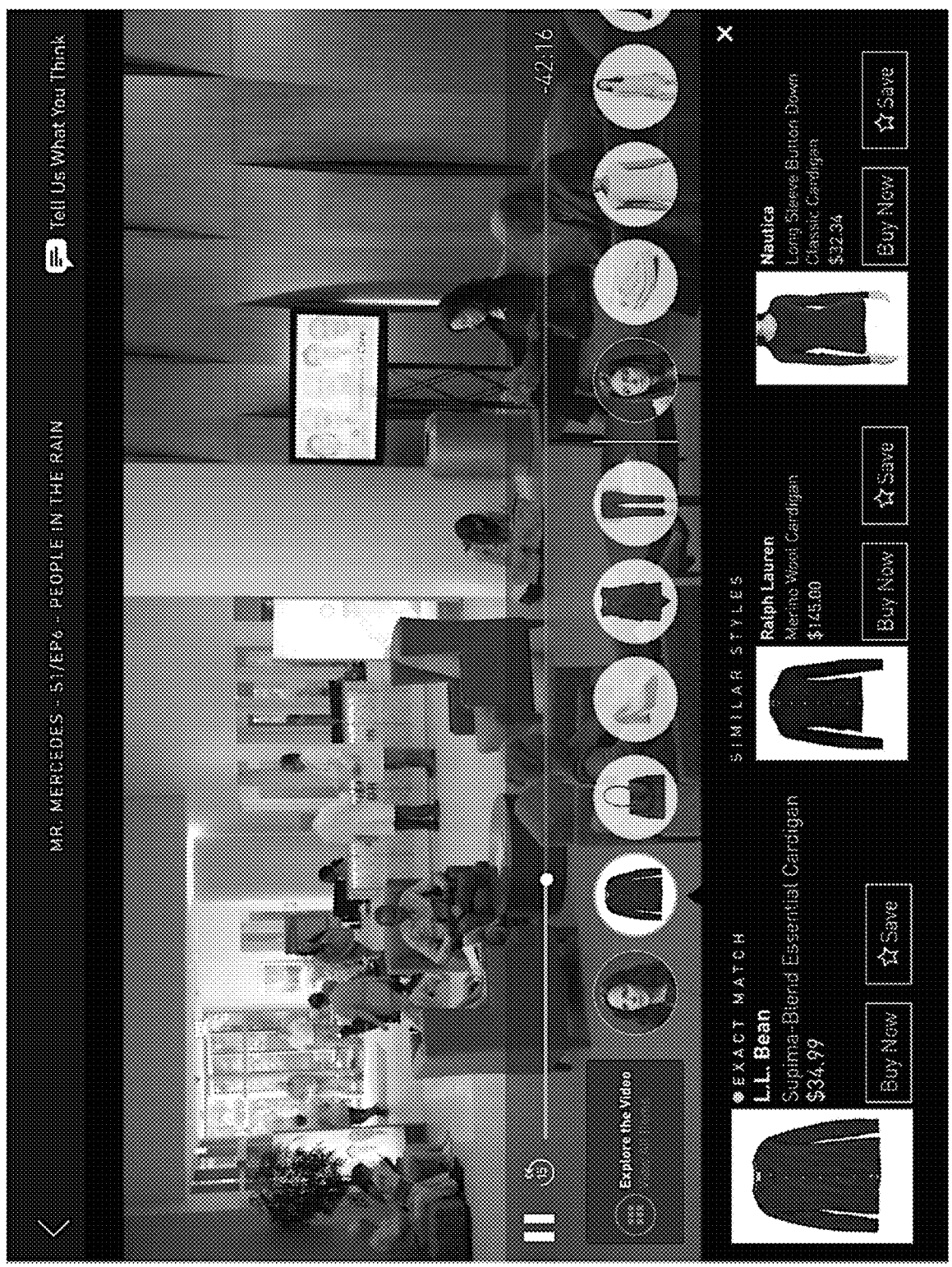

FIGS. 10A-10C illustrate another interface for desktop and mobile devices, such as smartphones and tablets, with a playbar of the video, that can be implemented with the systems shown in FIGS. 1A, 2, and 3 and the methods illustrated in FIGS. 1B, 4A, and 4B. This interface shows more information at glance than the overlay discussed above. FIG. 10A shows the video without the interface as it appears when playing on a computer, smartphone, or tablet. Tapping an object or certain region of the screen on a smartphone or tablet touchscreen or hovering over an object or certain region of the screen with a cursor on a desktop or laptop causes a playbar 1001 and product metadata 1003 to appear while the video continues playing as shown in FIG. 10B. (In general, the product metadata 1003 appears and disappears in conjunction with the playbar 1001.) The product metadata 1003 includes information about products shown on the screen at the current time. The products may remain on the screen without changing until the playbar 1001 disappears, which may occur after a few seconds of inaction or, on a mobile device, by tapping the touchscreen, and is invoked again. Clicking an "Explore the Video" button 1007 transitions to the Adjacent Layout described above.

FIG. 10C shows a product detail view 1007 that is invoked by tapping a product bubble in the product metadata 1003. The product detail view 1007 shows detailed product information for the selected product while the video continues playing on the display. Tapping the "X" at the upper right of the product detail view or the video closes product detail view 1007. The user can navigate the product detail view 1007 using a keyboard or keypad, e.g., with the arrow keys for direction and selecting products, the enter key to bring up the overlay, the shift key to go back. Desktops and mobile devices with microphones may also respond to voice commands. Pressing the "V" key activates the microphone. Suitable commands and queries include, but are not limited to: "What X is that?", "What is X wearing?", "What are they wearing?", and "Shop the movie."

Smart Television Interface with Voice Control

FIGS. 11A-11D illustrate a smart television interface with voice control that can be implemented with the systems shown in FIGS. 1A, 2, and 3 and the methods illustrated in FIGS. 1B, 4A, and 4B.

A user can watch a video (FIG. 11A) on, for example, a smart television without necessarily seeing the interface. The user can activate the Overlaid Video Player interface 1101 (FIG. 11B) by pressing a dedicated button on a remote control or other device that controls the smart television. Products or items shown in the Overlaid Video Player interface 1101 correspond to products or items displayed on the smart television when the user activates the Overlaid Video Player interface 1101. In some instances, the products or items shown in the Overlaid Video Player remain static while the video continues playing until the user sends another command via the remote control to clear or dismiss the Overlaid Video Player interface. The user can press an explore video button to transition, for example, to an Adjacent Layout interface discussed below. A user can navigate through the products or items displayed on the Overlaid Video Player interface via a pointer or cursor activated via the remote control.

Figure 11A:
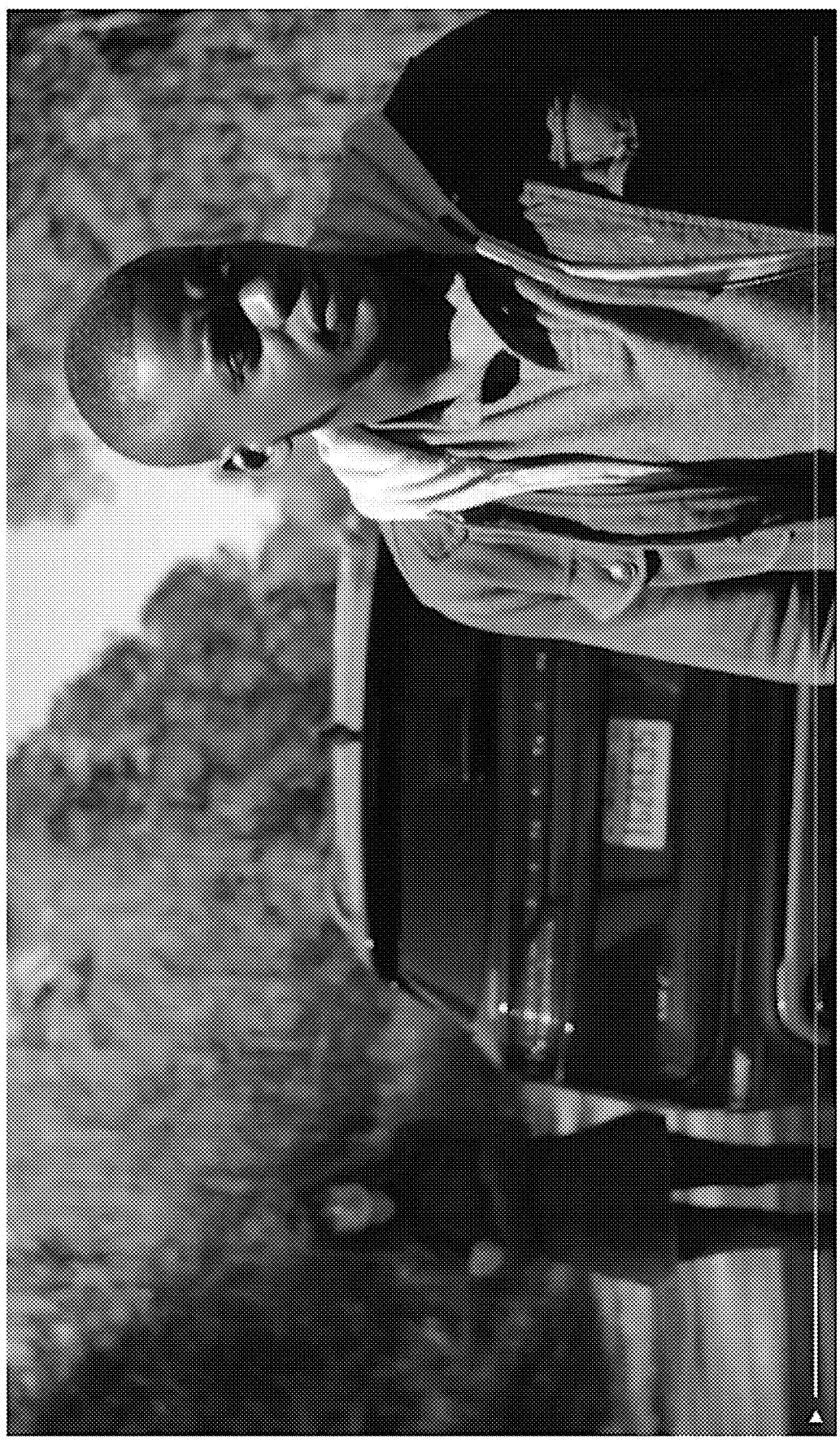
FIGS. 11A-11D illustrate an interactive interface that overlays metadata on video content displayed on a smart television, according to an embodiment.
Figure 11B:
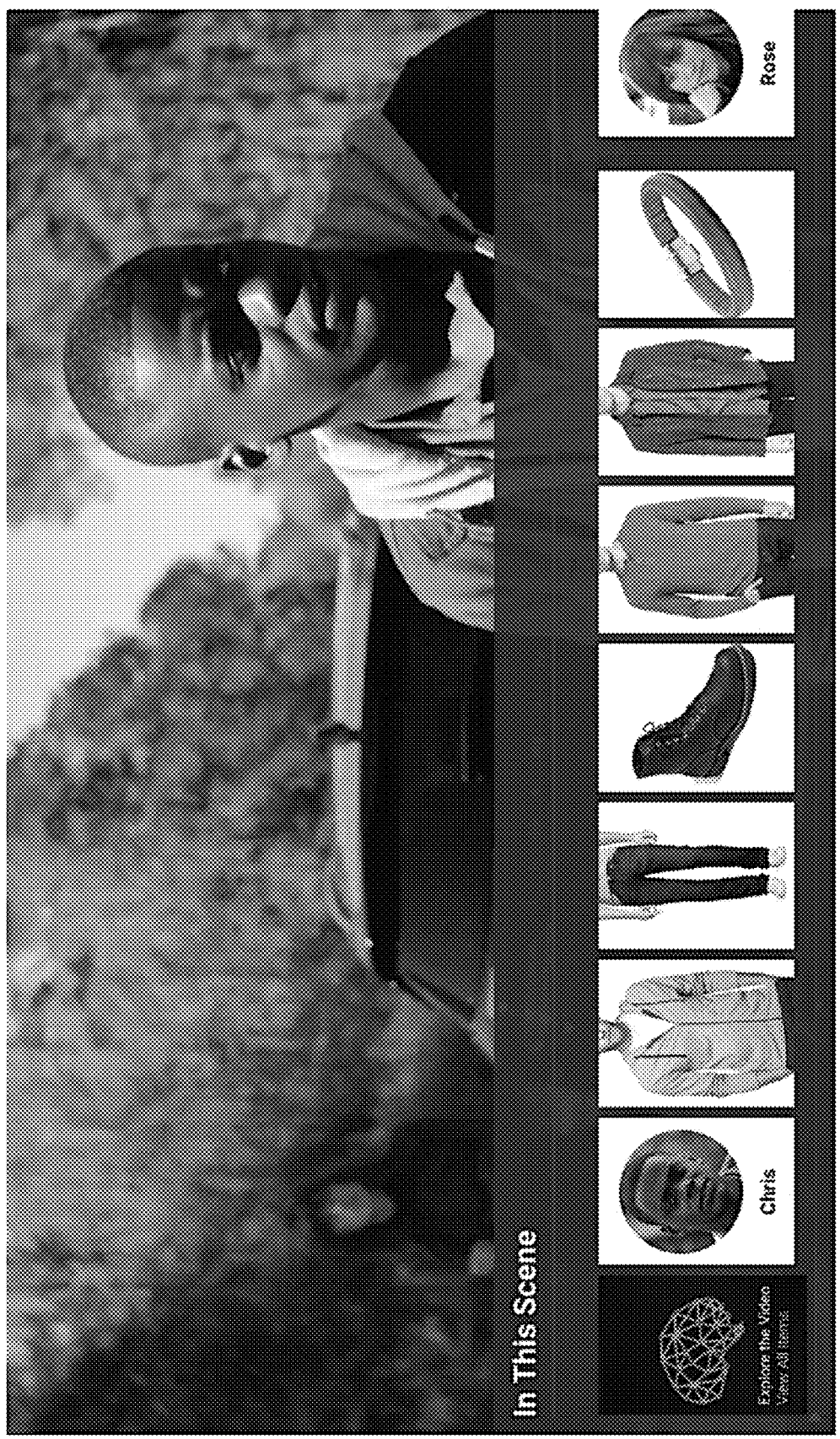
Figure 11C:
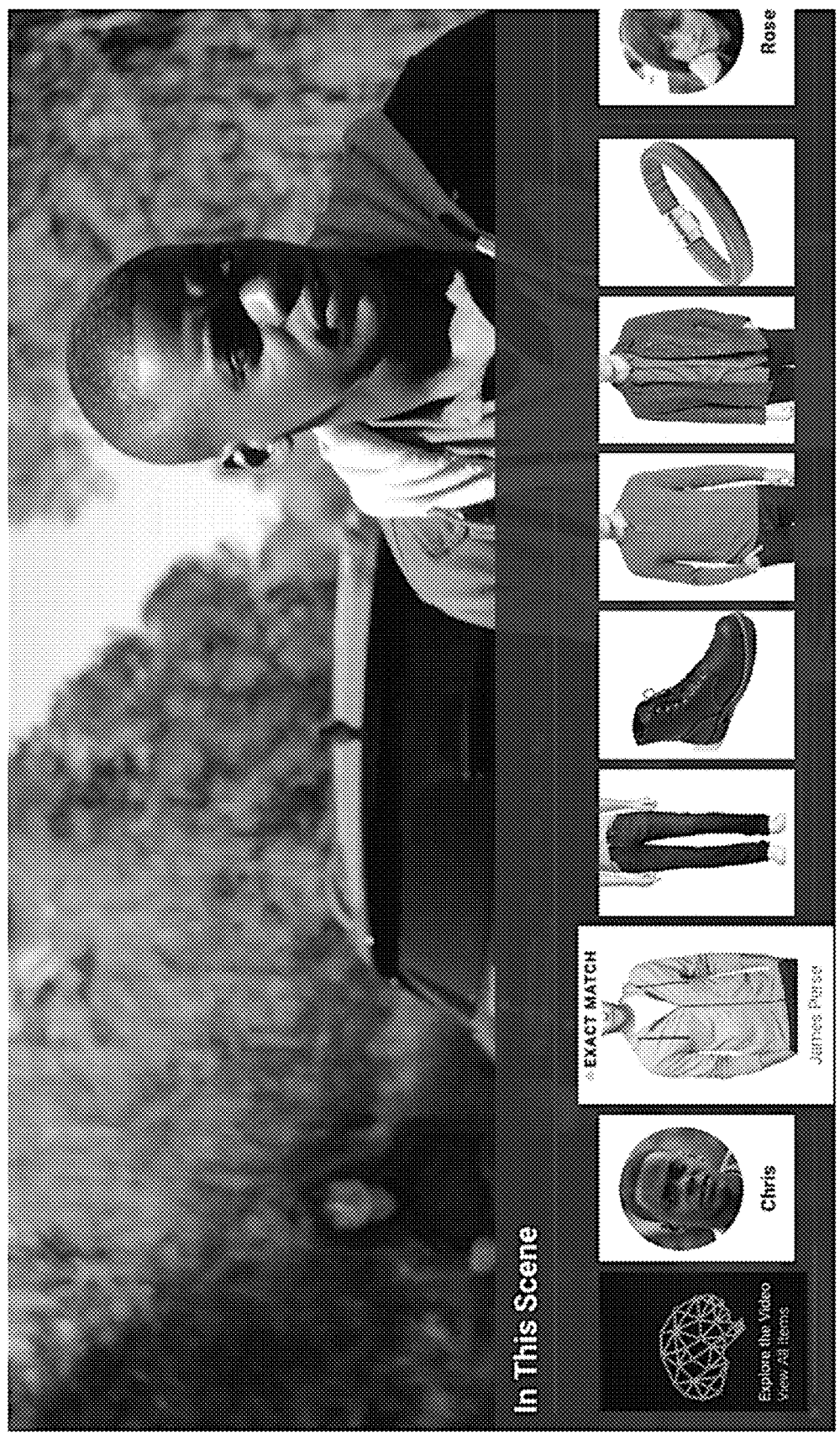
Figure 11D:
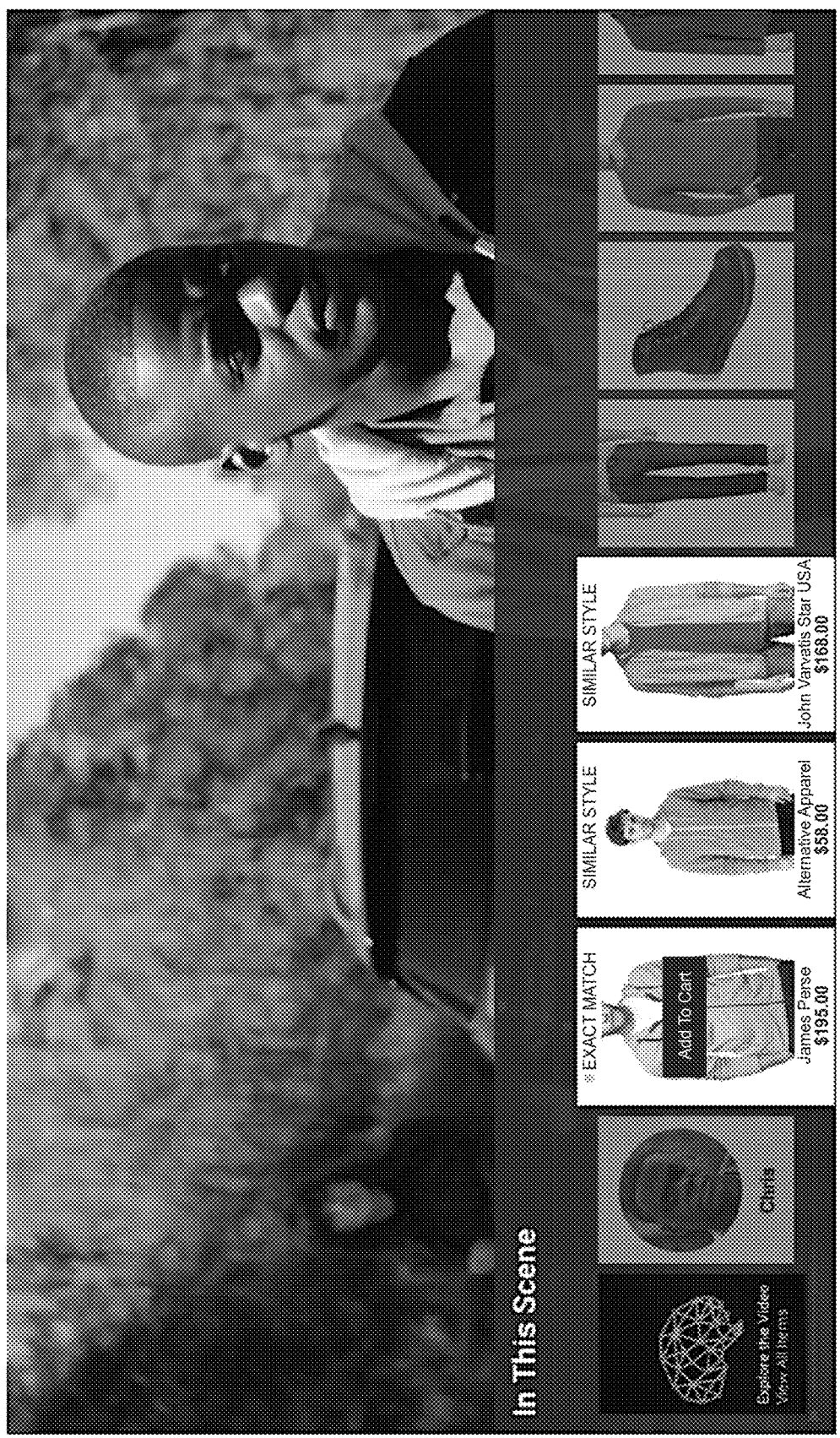

The image 1103 of a displayed product or item can be enlarged (FIG. 11C) when the user hovers the pointer or cursor over such an image. The user can scroll to the left or right on the Overlaid Video Player interface 1101 to view additional items or products using arrow keys or a directional pad on the remote control. The user can select an specific product or item displayed on the Overlaid Video Player interface by hitting the enter button on the remote control. This cause the Overlaid Video Player interface to display the product details and images of similar object 1105A and 1105B (FIG. 11D). The user can add the selected item to a cart for purchase and/or close the expanded interface by hitting a dedicated key on the remote or by continuing to navigate left or right past the selected product.

Figure 12A:
FIGS. 12A-12C illustrate voice control using the interactive interface of FIGS. 11A-11D, according to an embodiment.
Figure 12B:
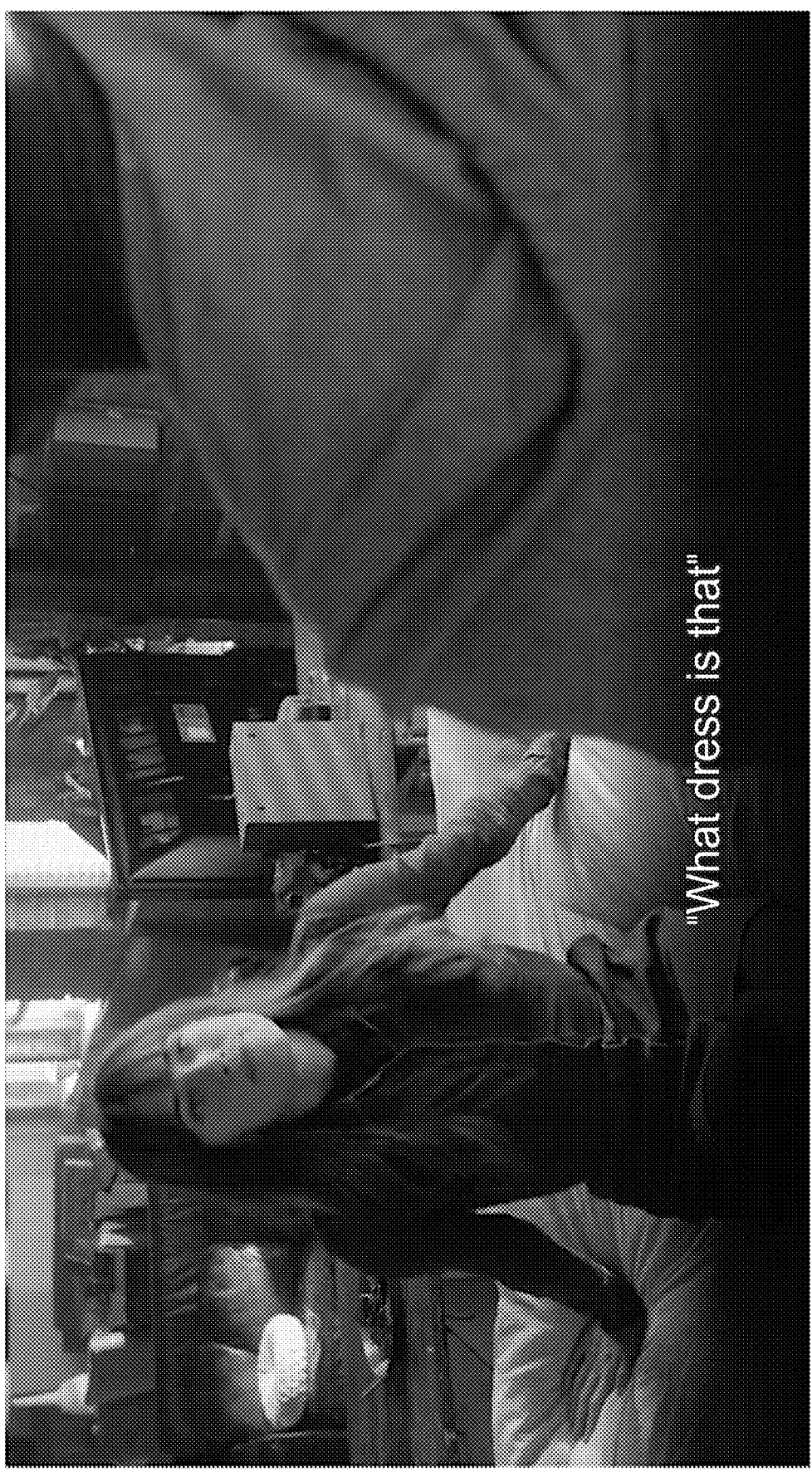
Figure 12C:
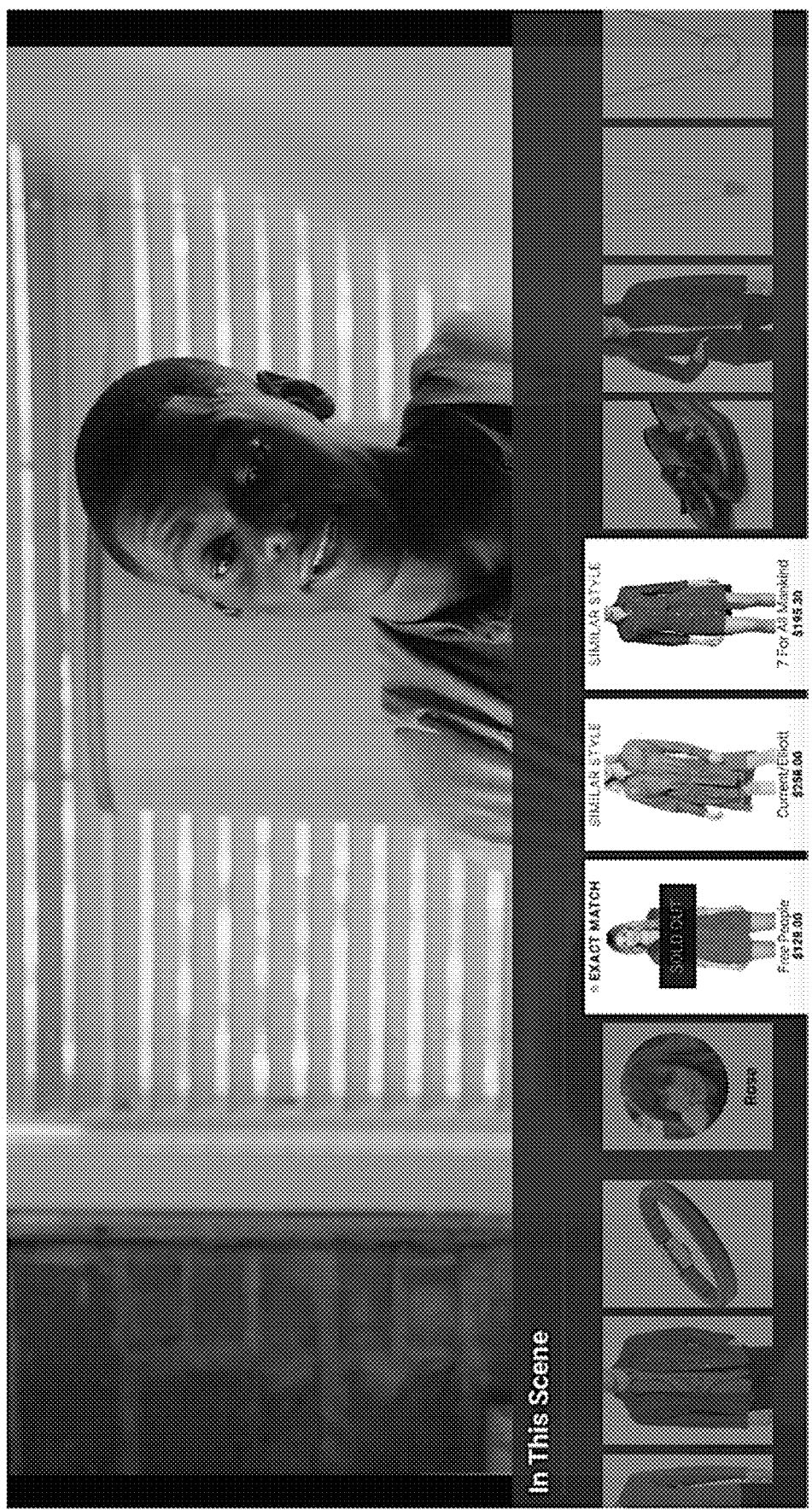

FIGS. 12A-12C illustrate voice control with the interface of FIGS. 11A-11D. They show how the Overlaid Video Player interface can be activated via a voice command or query received using a microphone in or operably coupled to a remote control or smart television. FIG. 12A shows a "Listening" prompt displayed by the smart television when the microphone is active and ready to receive a voice command or query from a user. These queries can be specific, e.g., "Which brown bag is she carrying?", or more general, e.g., "What is he wearing?" In response to receiving a voice command or query, the Overlaid Video Player interface converts the voice command or query into text that is displayed on the smart television as in FIG. 12B. The Overlaid Video Player interface executes the voice command and displays information about an item or product requested via the voice command in FIG. 12C.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include display screens for visual presentation of output and speakers or other sound generating devices for audible presentation of output (e.g., for viewing-impaired users). Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the specification above, all transitional phrases such as "comprising," "including," "carrying," "having," "containing," "involving," "holding," "composed of," and the like are to be understood to be open-ended. i.e., to mean including but not limited to.

The invention claimed is:

1. A method comprising:
  receiving, by an electronic device, a request from a user for video content;
  requesting, by the electronic device, the video content from a video server;

requesting, by the electronic device, metadata about a plurality of objects associated with the video content from a metadata server, the metadata comprising product identification information for respective products corresponding to the plurality of objects;

displaying, via a display of the electronic device, a frame of the video content to the user, the frame showing one or more people;

receiving, by the electronic device, an indication by the user to activate a shopping feature associated with the video content; and in response to the indication, displaying via the display of the electronic device:

a first visual representation identifying a first person of the one or more people; and a first subset of the metadata for a first subset of objects of the plurality of objects associated with the first person, wherein the first subset of the metadata includes a piece of metadata corresponding to an object of the first subset of objects that is not shown in the frame of the video content.

2. The method of claim 1, wherein the first visual representation of the first person includes at least one of an image of the first person or text showing a name of the first person.

3. The method of claim 1, wherein the first subset of the metadata includes product identification information for:

a product corresponding to an object of the first subset of objects, the product being associated with a first retailer; and an alternate product that is one of similar to the product, identical to the product and offered by a second retailer different from the first retailer, or a related product.

4. The method of claim 1, further comprising:

in response to the indication, displaying via the display of the electronic device:

a second visual representation identifying a second person of the one or more people; and a second subset of the metadata for a second subset of objects of the plurality of objects associated with the second person, wherein the first and second subsets of objects are different.

5. The method of claim 1, wherein:

the frame of the video content is a first frame;

the first subset of objects is shown in the first frame;

the first subset of the metadata is aligned to the first frame; and the method further comprises:

displaying, via the display of the electronic device, a second frame of the video content to the user, the second frame showing a second subset of objects of the plurality of objects different from the first subset of objects, the second frame not showing the first person;

removing, by the electronic device, display of the first visual representation and the first subset of the metadata; and displaying, via the display of the electronic device, a second subset of the metadata for the second subset of objects, the second subset of the metadata being aligned to the second frame.

6. The method of claim 1, wherein:

the metadata is obtained via at least one neural network that recognizes the plurality of objects by generating embeddings representing the plurality of objects appearing in the video content and performing a comparison of the embeddings to a plurality of embeddings stored in an object database.

7. The method of claim 1, further comprising:

storing the metadata about the plurality of objects in an entire video segment in a memory of the electronic device.

8. The method of claim 1, wherein:

the first subset of the metadata includes links for obtaining the first subset of objects, and wherein at least one of the links dynamically redirects the user to a website based on item availability, price, or relationship.

9. A method comprising:

receiving, by an electronic device, a request from a user for video content;

requesting, by the electronic device, the video content from a video server;

requesting, by the electronic device, metadata about a plurality of objects associated with the video content from a metadata server;

displaying, via a display of the electronic device, a frame of the video content to the user;

receiving, by the electronic device, an indication of a user interaction with the video content; and in response to the indication, displaying, via the display of the electronic device, a subset of the metadata for a subset of objects of the plurality of objects, the subset of the metadata including a piece of metadata corresponding to an object of the subset of objects that is not shown in the frame of the video content and is associated with a person shown in the video content.

10. The method of claim 9, wherein the indication of the user interaction with the video content comprises at least one of:

activating a shopping feature associated with the video content;

moving a cursor onto a product inset overlaid onto the video content; or at least one of clicking or tapping the video content.

11. The method of claim 9, wherein:

the frame of the video content shows the person; and the object that is not shown in the frame of the video content is associated with the person.

12. The method of claim 8, wherein:

the frame of the video content is a first frame; and the method further comprising, before displaying the first frame of the video content to the user:

displaying, via the display of the electronic device, a second frame of the video content to the user, the second frame showing the object that is not shown in the first frame of the video content.

13. The method of claim 9, wherein:

the frame shows the person;

the subset of objects is associated with the person; and the method further comprises:

in response to the indication, displaying via the display of the electronic device, a visual representation of the person with the subset of the metadata.

14. The method of claim 9, wherein:

the metadata is obtained via at least one neural network that recognizes the plurality of objects by generating embeddings representing the plurality of objects appearing in the video content and performing a comparison of the embeddings to a plurality of embeddings stored in an object database.

15. The method of claim 9, further comprising:
storing the metadata about the plurality of objects in an entire video segment in a memory of the electronic device.

16. The method of claim 9, wherein:
the subset of the metadata includes links for obtaining the subset of objects, and wherein at least one of the links dynamically redirects the user to a website based on item availability, price, or relationship.

\* \* \* \* \*